United States Patent [19]

Hoegerle

[11] Patent Number: 4,918,169
[45] Date of Patent: Apr. 17, 1990

[54] FIBER-REACTIVE DYESTUFFS COMPRISING A 5-FORMYLPYRIMIDINE MOIETY

[75] Inventor: Karl Hoegerle, Basel, Switzerland

[73] Assignee: Ciba-Geigy Corporation, Ardsley, N.Y.

[21] Appl. No.: 233,781

[22] Filed: Aug. 19, 1988

[30] Foreign Application Priority Data

Aug. 27, 1987 [CH] Switzerland ............... 3288/87

[51] Int. Cl.$^4$ ............ C09B 62/04; C09B 62/06; C09B 62/08; C09B 62/10; C09B 62/24; C09B 62/245; C09B 62/25; C09B 62/255; D06P 3/10; D06P 3/66; D06P 1/384

[52] U.S. Cl. .................. 534/618; 534/588; 534/597; 534/598; 534/593; 534/594; 534/617; 534/619; 534/620; 534/621; 534/622; 534/623; 534/624; 534/625; 534/626; 534/627; 534/628; 534/629; 534/630; 534/631; 534/632; 534/633; 534/634; 534/635; 534/636; 534/637; 534/638; 534/642; 534/643; 534/641; 534/652; 534/689; 534/722; 534/725; 534/772; 534/793; 534/800; 534/827; 534/832; 534/836; 534/840; 534/841; 534/860; 534/872; 534/878; 534/880; 544/225; 544/294; 544/296; 544/322; 544/328; 544/329; 544/333; 544/334; 544/335; 260/374

[58] Field of Search .................. 534/617–638; 544/225, 294, 296, 322, 328, 329, 333, 334, 335

[56] References Cited

U.S. PATENT DOCUMENTS 4,709,018 11/1987 Seitz .................... 534/618
4,754,023 6/1988 Tzikas et al. ........... 534/618

FOREIGN PATENT DOCUMENTS 0159292 10/1985 European Pat. Off. ........... 534/618
2310334 9/1973 Fed. Rep. of Germany ... 534/617 X
3603797 8/1987 Fed. Rep. of Germany ...... 534/617

OTHER PUBLICATIONS

Chem. Abstract, vol. 79, 146549p (1973).
Chem. Abstract, vol. 108, 108:75112 (1988).

Primary Examiner—Floyd D. Higel
Attorney, Agent, or Firm—Edward McC. Roberts; George R. Dochmann

[57] ABSTRACT

Reactive dyes suitable for dyeing and printing cellulosic fiber materials by the cold pad-batch process having the formula

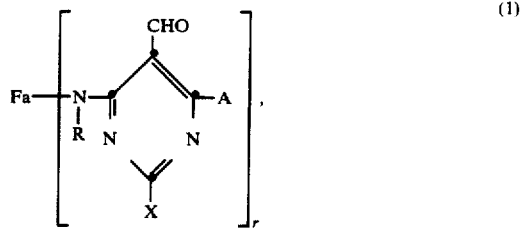

wherein Fa is a monoazo or polyazo, metal complex azo, anthraquinone, phthalocyanine, formazane, azomethine, dioxazine, phenazine, stilbene, triphenylmethane, xanthene, thioxanthone, nitroaryl, napthoquinone, pyrenequinone or perylene-tetracarbimide dye radical, X is halogen, $C_1$–$C_4$-alkylsulfonyl, phenylsulfonyl, a sulfonic acid or phosphonic acid group or a quaternized ammonium group, r is 1 or 2, R is hydrogen or $C_1$–$C_4$ alkyl which is unsubstituted or substituted by halogen, hydroxyl, cyano, carboxyl, sulfo, sulfato, $C_1$–$C_4$-alkoxycarbonyl, $C_1$–$C_4$-alkoxy or phenyl, and A is a radical of the formula

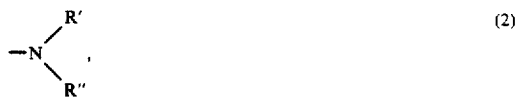

wherein R' is hydrogen, $C_1$–$C_4$ alkyl which is unsubstituted or substituted by halogen, hydroxyl, cyano, carboxyl, sulfo, sulfato, $C_1$–$C_4$-alkoxycarbonyl, $C_1$–$C_4$-alkoxy or phenyl, $C_5$–$C_6$ cycloalkyl, phenyl or naphthyl each of which is unsubstituted or substituted by $C_1$–$C_4$-alkyl, $C_1$–$C_4$-alkoxy, carboxyl, sulfo or halogen, or a radical of the formula

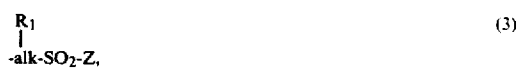

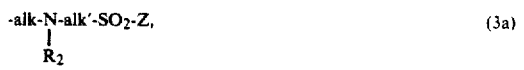

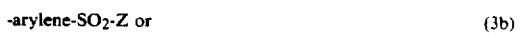

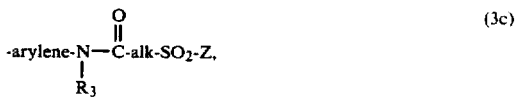

wherein alk and alk' are each independently of the other $C_1$–$C_6$ alkylene, arylene is phenylene or naphthylene, each of which is unsubstituted or substituted by sulfo, carboxyl, $C_1$–$C_4$-alkyl, $C_1$–$C_4$-alkoxy or halogen, $R_1$ is hydrogen, hydroxyl, sulfo, sulfato, carboxyl, cyano, halogen, $C_1$–$C_4$ alkoxycarbonyl, $C_1$–$C_4$ alkanoyloxy, carbamoyl or the group —$SO_2$—Z, $R_2$ is hydrogen or $C_1$–$C_4$ alkyl, $R_3$ is hydrogen or $C_1$–$C_4$ alkyl which is unsubstituted or substituted by hydroxyl, sulfo, sulfato, carboxyl or cyano, Z is —CH=$CH_2$ or —$CH_2$—$CH_2$—Y and Y is —Cl, —Br, —F, —$OSO_3H$, —$SSO_3H$, (Abstract continued on next page.)

—OCO—CH₃, —OCO—C₆H₅, —OPO₃H₂, —OCO—CCl₃, —OCO—CHCl₂, —OCO—CH₂Cl, OSO₂—R₄, wherein R₄ is $C_1$–$C_4$ alkyl or phenyl which is unsubstituted or substituted by $C_1$–$C_4$ alkyl, or —OSO₂—N($C_1$–$C_4$alkyl)₂; and R" independently has the meaning of R or is a radical of formula (3) above; or R' and R", together with the N atom, form a radical of the formula

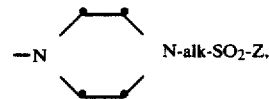

wherein alk and Z are as defined above.

15 Claims, No Drawings

FIBER-REACTIVE DYESTUFFS COMPRISING A 5-FORMYLPYRIMIDINE MOIETY

The present invention relates to novel reactive dyes, to processes for their preparation and to the use thereof for dyeing or printing fibre materials.

The practice of dyeing with reactive dyes has given rise in recent times to more stringent requirements being made of the quality of the dyeings and the economy of the dyeing process. For this reason there is still a need for novel reactive dyes with improved properties, especially application properties.

For dyeing cotton by the cold pad-batch process it is necessary at the present time to use reactive dyes which have a sufficient substantivity adapted to the low dyeing temperature and which at the same time have the property of being easily washed off to remove non-fixed dye. The dyes should also have high reactivity, so that only short batching times are necessary, and, in particular, they should give dyeings with high degrees of fixation. These requirements are only insufficiently fulfilled by known dyes.

Accordingly, the object of the present invention is to provide novel improved reactive dyes for the cold pad-batch process which have the above-specified qualities to a high degree. The novel dyes should be distinguished in particular by high fixation yields and high dye-fibre bond stability, and they should further have the property of being easily washed off to remove non-fixed dye. They should also produce dyeings with good general fastness properties, for example lightfastness and wetfastness.

It has been found that this object is accomplished with the novel reactive dyes defined below.

The invention relates to reactive dyes of the formula

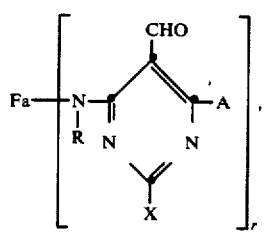  (1)

wherein Fa is the radical of an organic dye of the monoazo or polyazo, metal complex azo, anthraquinone, phthalocyanine, formazane, azomethine, dioxazine, phenazine, stilbene, triphenylmethane, xanthene, thioxanthone, nitroaryl, naphthoquinone, pyrenequinone or perylenetetracarbimide series, X is a removable substituent, r is the number 1 or 2, R is hydrogen or $C_1$–$C_4$alkyl which can be substituted by unreactive radicals, and A is a radical of the formula

  (2)

wherein R' is hydrogen, $C_1$–$C_4$-alkyl which is unsubstituted or substituted by one or more unreactive radicals, $C_5$–$C_6$cycloalkyl, aryl which is unsubstituted or substituted by one or more unreactive radicals, or a reactive radical of the formula

  (3)

  (3a)

  (3b)

  (3c)

wherein alk and alk' are each independently of the other a $C_1$–$C_6$alkylene radical, arylene is a substituted or unsubstituted arylene radical, $R_1$ is hydrogen, hydroxyl, sulfo, sulfato, carboxyl, cyano, halogen, $C_1$–$C_4$alkoxycarbonyl, $C_1$–$C_4$alkanoyloxy, carbamoyl or the group —$SO_2$—Z, $R_2$ is hydrogen or $C_1$–$C_4$alkyl, $R_3$ is hydrogen or $C_1$–$C_4$alkyl which is unsubstituted or substituted by hydroxyl, sulfo, sulfato, carboxyl or cyano, Z is —CH=$CH_2$ or —$CH_2$—$CH_2$—Y and Y is a leaving group; and R'' independently has the meaning of R or is a reactive radical of formula (3) above; or R' and R'', together with the N atom, form a radical of the formula

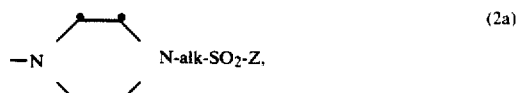  (2a)

wherein alk and Z are as defined above.

The radical Fa in formula (1) can contain, bonded to its skeleton, the substituents conventionally found in organic dyes.

Examples of suitable substituents in the radical Fa are: $C_1$–$C_4$-alkyl, which generally includes methyl, ethyl, n- or iso-propyl or n-, sec-or tert-butyl; $C_1$–$C_4$alkoxy, which will generally be understood as meaning methoxy, ethoxy, n- or iso-propoxy or n-, sec- or tert-butoxy; $C_1$–$C_4$alkanoylamino, especially acetylamino or propionylamino; benzoylamino; amino; N-mono- or N,N-di-$C_1$–$C_4$alkylamino, in which the alkyl moiety may be further substituted e.g. by —OH, —OCOCH$_3$, —OSO$_3$H, —CN or halogen, e.g. methylamino, ethylamino, n- or isopropylamino, n-, sec- or tert-butylamino, N,N-di-β-hydroxyethylamino, N,N-di-β-sulfatoethylamino, hydroxypropylamino, β-sulfatoethylamino, β-chloroethylamino or β-acetoxyethylamino; phenylamino; mono- or di-sulfobenzylamino; $C_1$–$C_4$alkoxycarbonyl, e.g. methoxy- or ethoxycarbonyl; $C_1$–$C_4$alkylsulfonyl, e.g. methylsulfonyl or ethylsulfonyl; trifluoromethyl; nitro; cyano; halogen, which will generally be understood as meaning fluorine, chlorine and bromine; carbamoyl; N-mono- or N,N-di-$C_1$–$C_4$alkylcarbamoyl; sulfamoyl; N-mono- or N,N-di-$C_1$–$C_4$alkylsulfamoyl; N-(β-hydroxyethyl)sulfamoyl; N,N-di(β-hydroxyethyl)sulfamoyl; N-phenylsulfamoyl; hydroxyl; carboxyl; sulfo; sulfomethyl and ureido.

Fa is preferably the radical of an organic dye of the monoazo or polyazo, metal complex azo, anthraquinone, phthalocyanine, formazane or dioxazine series, which is substituted by one or more of the above-mentioned radicals.

The radical Fa most preferably contains one or more sulfo groups and can also be further substituted by one or more of the above-mentioned radicals.

Fa as the radical of a monoazo or disazo dye is most preferably substituted by one or more radicals selected from the group consisting of methyl, ethyl, methoxy, ethoxy, acetylamino, benzoylamino, amino, chlorine, bromine, ureido, hydroxyl, carboxyl, sulfomethyl and sulfo.

R as a substituted $C_1$-$C_4$alkyl radical can be e.g. a $C_1$-$C_4$alkyl radical substituted by halogen, hydroxyl, cyano, carboxyl, sulfo, sulfato, $C_1$-$C_4$alkoxycarbonyl, $C_1$-$C_4$alkoxy or phenyl.

Examples of substituted $C_1$-$C_4$alkyl radicals are: carboxymethyl, β-carboxyethyl, methoxycarbonylmethyl, ethoxycarbonylmethyl, β-methoxyethyl, β-ethoxyethyl, β-chloroethyl, Y-bromopropyl, Y-chloropropyl, β-hydroxyethyl, β-hydroxybutyl, β-cyanoethyl, sulfomethyl, β-sulfoethyl and β-sulfatoethyl.

R is preferably methyl or ethyl and in particular hydrogen.

The removable substituent X is e.g. a halogen atom such as fluorine, chlorine or bromine, a $C_1$-$C_4$alkylsulfonyl group such as methylsulfonyl or ethylsulfonyl, the phenylsulfonyl radical, a sulfonic acid or phosphonic acid group or a quaternized ammonium group.

The removable substituent X is preferably fluorine or chlorine.

The part of formula (1) which is enclosed in square brackets is a reactive radical which can occur once or twice in the molecule. When r=2, the two reactive radicals can be identical or different. The two radicals are preferably identical.

Reactive dyes of formula (1) wherein r=1 are especially preferred.

R' as a substituted $C_1$-$C_4$alkyl radical in formula (2) independently has the meanings and preferences previously indicated for R.

R' as a cycloalkyl radical is e.g. the cyclohexyl radical.

R' as an aryl radical is e.g. a naphthyl radical and preferably a phenyl radical, each of which may be unsubstituted or substituted e.g. by $C_1$-$C_4$alkyl, $C_1$-$C_4$alkoxy, carboxy, sulfo and/or halogen.

Examples of suitable aryl radicals R' are phenyl, o-, m- or p-methylphenyl, o-, m- or p-methoxyphenyl, o-, m- or p-chlorophenyl, o-, m- or p-sulfophenyl, o-carboxyphenyl, 2,4- or 2,5-disulfophenyl, 1- or 2-naphthyl, 1-sulfo-2-naphthyl or 4,8-disulfo-2-naphthyl.

R' as an aryl radical is preferably unsubstituted phenyl or phenyl which is substituted by chlorine, methyl, ethyl, methoxy, ethoxy, carboxyl and/or sulfo. Sulfophenyl and disulfophenyl are especially preferred.

Where R' is a radical of formula (3), (3a), (3b) or (3c) above, alk and alk' are each independently of the other e.g. methylene, ethylene, 1,3-propylene, 1,4-butylene, 1,5-pentylene or 1,6-hexylene or branched isomers thereof.

Each of alk and alk' independently of the other is preferably a $C_1$-$C_4$-alkylene radical and, most preferably, an ethylene radical.

Arylene is e.g. a phenylene or naphthylene radical, each of which is unsubstituted or substituted e.g. by sulfo, carboxyl, $C_1$-$C_4$alkyl, $C_1$-$C_4$alkoxy and/or halogen.

The preferred meaning of arylene is a 1,3- or 1,4-phenylene radical which is unsubstituted or substituted e.g. by sulfo, methyl, methoxy or carboxyl.

$R_1$ is preferably hydrogen or the group —$SO_2$—Z, wherein Z is as defined above. $R_1$ is most preferably hydrogen.

$R_2$ is preferably hydrogen.

$R_3$ is preferably hydrogen or $C_1$-$C_4$alkyl.

Suitable leaving groups Y are e.g. —Cl, —Br, —F, —$OSO_3H$, —$SSO_3H$, —OCO—$CH_3$, —OCO—$C_6H_5$, —$OPO_3H_2$, —OCO—$CCl_3$, —OCO—$CHCl_2$, —O—CO—$CH_2Cl$, $OSO_2$—$R_4$, wherein $R_4$ is $C_1$-$C_4$alkyl or phenyl which may be substituted by $C_1$-$C_4$alkyl, or —$OSO_2$—N($C_1$-$C_4$alkyl)$_2$.

Y is preferably the group —Cl, —$OSO_3H$, —$SSO_3H$, —$OCOCH_3$, —OCO—$C_6H_5$ or —$OPO_3H_2$.

R' as a reactive radical preferably has the formula

-alk-$SO_2$-Z',

-alk-NH-alk'-$SO_2$-Z', (3a')

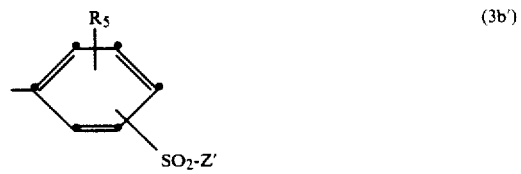

or

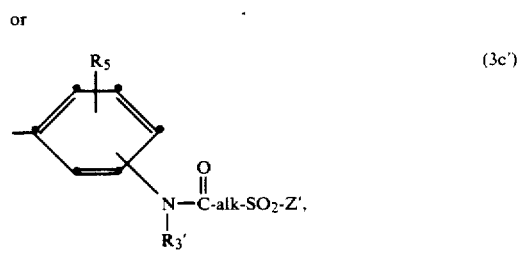

wherein alk and alk' are each independently of the other a $C_1$-$C_4$alkylene radical, $R'_1$ is hydrogen or the group —$SO_2$—Z', Z' is —CH=$CH_2$ or —$CH_2$—$CH_2$—Y', Y' is —Cl, —$OSO_3H$, —$SSO_3H$, —$OCOCH_3$, —O—CO—$C_6H_5$ or —$OPO_3H_2$, $R_5$ is hydrogen, sulfo, carboxyl, chlorine, methoxy or methyl and $R'_3$ is hydrogen or $C_1$-$C_4$alkyl.

R' is most preferably $C_1$-$C_4$alkyl which is unsubstituted or substituted by hydroxyl, carboxyl, sulfo or sulfato, phenyl which is unsubstituted or substituted by methyl, ethyl, methoxy, ethoxy, carboxyl, sulfo and/or chlorine, or a radical of formula (3'), (3a'), (3b') or (3c') given above.

R" as substituted $C_1$-$C_4$alkyl in formula (2) independently has the meanings and preferences previously given for R. R" as a reactive radical preferably has the formula (3') above and, most preferably, has the formula —alk—$SO_2$—Z'     (3")

wherein alk and Z' are as defined for formulae (3')-(3c').

R" is preferably hydrogen, $C_1$-$C_4$alkyl or the radical of formula (3") above. The most preferred meanings of R" are hydrogen, methyl, ethyl or the radical of the formula —$CH_2$—$CH_2$—$SO_2$—Z', wherein Z' is as defined for formulae (3')-(3c').

If R' and R" together with the N atom form a radical of formula (2a) given above, the variables alk and Z contained therein have the meanings and preferences indicated previously.

A preferred embodiment of the reactive dyes of the invention relates to compounds of formula (1) above, wherein A is a radical of the formula

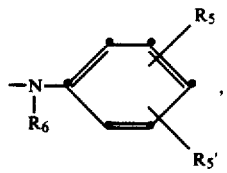   (4)

wherein $R_6$ is hydrogen, methyl or ethyl, $R_5$ is hydrogen, sulfo, carboxyl, chlorine, methoxy or methyl, and $R'_5$ independently has the meaning of $R_5$, or is a radical of the formula

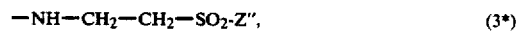 (3*)

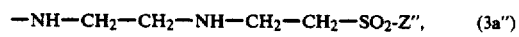 (3a")

 (3b")

 (3c")

 (2a')

or

 (5)

wherein Z" is —CH=CH$_2$, —CH$_2$—CH$_2$—Cl or —CH$_2$—CH$_2$—OSO$_3$H in each case. A preferred group of reactive dyes of the invention comprises compounds of formula (1) above, wherein Fa is the radical of an organic dye of the monoazo or polyazo, metal complex azo, anthraquinone, phthalocyanine, formazane or dioxazine series, which radical carries one or more sulfo groups and can also be further substituted by one or more of the above-mentioned radicals, R is hydrogen or a C$_1$-C$_4$alkyl radical which is unsubstituted or substituted e.g. by halogen, hydroxyl, cyano, carboxyl, sulfo, sulfato, C$_1$-C$_4$alkoxycarbonyl, C$_1$-C$_4$alkoxy or phenyl, X is chlorine or fluorine, r is 1 and A is a radical of formula (2) above, wherein R' is C$_1$-C$_4$alkyl which is unsubstituted or substituted by hydroxyl, carboxyl, sulfo or sulfato, phenyl which is unsubstituted or substituted by methyl, ethyl, methoxy, ethoxy, carboxyl, sulfo or chlorine, or is a radical of formula (3'), (3a'), (3b') or (3c') above, and R" is hydrogen, C$_1$-C$_4$alkyl or a radical of formula (3') above, or R' and R", together with the N atom, are a radical of formula (2a) above.

An especially preferred group of reactive dyes of the invention comprises compounds of formula (1) above, wherein Fa is the radical of an organic dye of the monoazo, polyazo or metal complex azo series, which radical carries one or more sulfo groups and may be further substituted by one or more of the above-mentioned radicals, R is hydrogen, methyl or ethyl, X is chlorine, r is 1 and A is a radical of formula (2a'), (3*), (3a"), (3b"), (3c"), (4) or (5) given above.

Preferred subgroups of the reactive dyes of formula (1) are:

(a) Monoazo or disazo dyes of the formula

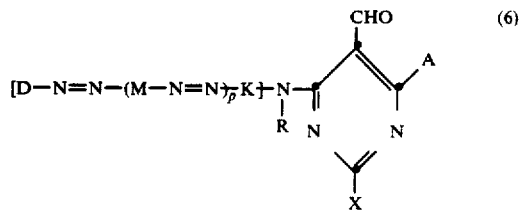 (6)

or of the formula

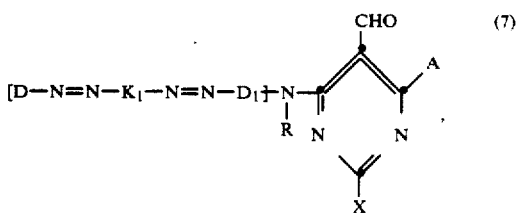 (7)

wherein R, A and X each have the meanings and preferences indicated previously, D and D$_1$ are each independently of the other a diazo component of the benzene or naphthalene series, M is an intermediate component of the benzene or naphthalene series, K is a coupling component of the benzene or naphthalene series or of the heterocyclic series, K$_1$ is the radical of a coupling component of the aminonaphtholsulfonic acid series and p is 0 or 1.

Representative subgroups of the reactive dyes of formula (6) are: compounds of the formula

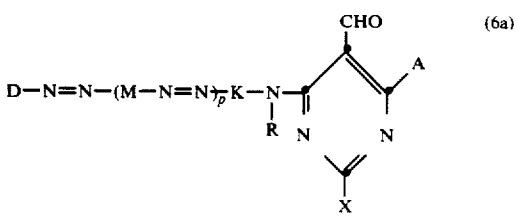 (6a)

and compounds of the formula

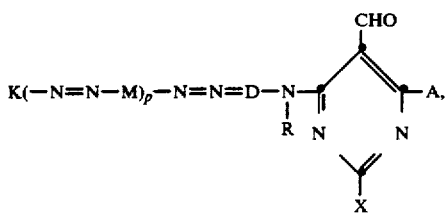

(6b)

wherein R, A, X, K, D, M and p are each as defined above.

Eligible reactive dyes are also those of formulae (6), (6a), (6b) and (7), wherein the radicals D, D₁ and/or K contain yet another reactive radical, so that trireactive and tetrareactive dyes are also comprised. The additional reactive radicals contained in D, D₁ or K can be bounded to D, D₁ or K via an amino group or in some other way, e.g. by a direct bond.

An additional reactive radical which may be contained in D, D₁ or K is in particular a low-molecular alkanoyl or alkylsulfonyl radical substituted by a removable atom or a removable group, a low-molecular alkenoyl or alkenesulfonyl radical which may be substituted by a removable atom or a removable group, a carbocyclic or heterocyclic radical containing 4, 5 or 6 rings, substituted by a removable atom or a removable group and bonded via a carbonyl or sulfonyl group, or a triazine or pyrimidine radical substituted by a removable atom or a removable group and bonded direct via a carbon atom, or contains such a radical. Examples of these types of reactive radical are a six-membered heterocyclic radical containing halogen atoms and bonded via an amino group, such as a halotriazine or halopyrimidine radical, or an aliphatic acyl radical such as a haloacetyl or halopropionyl radical.

The additional reactive radical is in particular a vinylsulfonyl, β-sulfatoethylsulfonyl, β-thiosulfatoethylsulfonyl, β-chloroethylsulfonyl or β-acetoxyethylsulfonyl radical bonded direct or via a bridging link.

The above explanations also apply by analogy to metal complex azo dyes and to other chromophores mentioned in the definition of the dye radical D in formula (1).

The radicals D and D₁ can be derived e.g. from the following diazo components:

aminobenzene, 1-amino-2-, -3- or -4-methylbenzene, 1-amino-2-, -3- or -4-methoxybenzene, 1-amino-2-, -3- or -4-chlorobenzene, 1-amino-2,5-dichlorobenzene, 1-amino-2,5-dimethylbenzene, 1-amino-3-methyl-6-methoxybenzene, 1-amino-2-methoxy-4-nitrobenzene, 1-aminobiphenyl, 1-aminobenzene-2-, -3- or -4-carboxylic acid, 2-aminodiphenyl ether, 1-aminobenzene-2-, -3- or -4-sulfonamide, 1-aminobenzene-2-, -3- or -4-sulfonic acid, 1-aminobenzene-2,4- and -2,5-disulfonic acid, 1-amino-4-methylbenzene-2-sulfonic acid, 1-amino-4-methoxybenzene-2-sulfonic acid, 1-amino-4-ethoxybenzene-2-sulfonic acid, 1-amino-3-methylbenzene-6-sulfonic acid, 1-amino-6-methylbenzene-3- or -4-sulfonic acid, 1-aminonaphthalene, 2-aminonaphthalene, 1-aminonaphthalene-2-, -4-, -5-, -6-, -7- or -8-sulfonic acid, 2-aminonaphthalene-1-, -3-, -4-, -5-, -6-, -7- or -8-sulfonic acid, 1-aminonaphthalene-3,6-or -5,7-disulfonic acid, 2-aminonaphthalene-1,5-, -1,7-, -3,6-, -5,7-, -4,8- or -6,8-disulfonic acid, 1-aminonaphthalene-2,5,7-trisulfonic acid, 2-aminonaphthalene-1,5,7-, -3,6,8- or -4,6,8-trisulfonic acid, 4-aminoazobenzene-3,4'-disulfonic acid, 3-methoxy-4-amino-6-methylazobenzene-2',4'-disulfonic acid, 3-methoxy-4-amino-6-methylazobenzene-2',5'-disulfonic acid, 1-amino-4-β-sulfatoethylsulfonylbenzene, 1-amino-4-vinylsulfonylbenzene, 1-amino-3-vinylsulfonylbenzene, 1-amino-4-β-sulfatoethylsulfonylbenzene-2-sulfonic acid, 1-amino-4-[β-(β'-chloroethylsulfonyl)ethylaminocarbonyl]benzene-2-sulfonic acid, 1-amino-4-β-(vinylsulfonyl)ethylaminocarbonylbenzene-2-sulfonic acid, 1-amino-3-γ-(vinylsulfonyl)butyrylaminobenzene-6-sulfonic acid, 1-amino-3-vinylsulfonyl-6-methoxybenzene, 1-amino-3-β-(vinylsulfonyl)ethylaminocarbonyl-6-methoxybenzene and 1-amino-3-β-(vinylsulfonyl)ethylaminocarbonylbenzene; and also diaminobenzenes or diaminonaphthalenes, such as 1,4-diaminobenzene-2-sulfonic acid, 1,4-diaminobenzene-2,5-disulfonic acid, 1,4-diaminobenzene-2,6-disulfonic acid, 1,3-diaminobenzene-4-sulfonic acid, 1,3-diaminobenzene-4,6-disulfonic acid, 1,4-diamino-2-chlorobenzene-5-sulfonic acid, 1,4-diamino-2-methylbenzene-5-sulfonic acid, 1,5-diamino-6-methylbenzene-3-sulfonic acid, 1,3-diamino-6-methylbenzene-4-sulfonic acid, 1,4-diaminobenzene-2-carboxylic acid, 1,3-diaminobenzene-4-carboxylic acid, 1-amino-3-aminomethylbenzene-6-sulfonic acid, 1-amino-3-aminomethyl-4-methoxybenzene-2-sulfonic acid, 2,6-diaminonaphthalene-4,8-disulfonic acid, 2-amino-5-aminomethylnaphthalene-1-sulfonic acid and 2-amino-5-aminoethylnaphthalene-1,7-disulfonic acid; instead of a diamine, it is also possible to use an aminoacetylamino compound from which the acetyl group is subsequently eliminated by saponification, e.g. 1-acetylamino-3-aminobenzene-4-sulfonic acid or 1-acetylamino-4-aminobenzene-3-sulfonic acid.

The radical M can be derived e.g. from the following intermediate components:

aniline; m-toluidine; 2,5-dimethyl- or -dimethoxy-aniline; m-aminoanisole; m-acetylamino-, m-propionylamino-, m-butyrylamino- or m-benzoylaminoaniline; m-aminophenylurea; 4-acetamino-2-amino-toluene or -anisole; 2-amino-4-methylanisole; 1-aminonaphthalene-6- or -7-sulfonic acid; 2-amino-4-acetylaminobenzenesulfonic acid; 2-amino-5-naphthol-7-sulfonic acid; 2-amino-8-naphthol-6-sulfonic acid; 2-(4-aminobenzoylamino)-5-naphthol-7-sulfonic acid and 3-sulfo-4-aminoacetoacetanilide.

The following are examples of the large number of possible coupling components K and K₁:

phenol, 1-hydroxy-3- or -4-methylbenzene, 1-hydroxybenzene-4-sulfonic acid, 1-hydroxynaphthalene, 2-hydroxynaphthalene, 2-hydroxynaphthalene-6-or -7-sulfonic acid, 2-hydroxynaphthalene-3,6- or -6,8-disulfonic acid, 1-hydroxynaphthalene-4-sulfonic acid, 1-hydroxynaphthalene-4,6-or -4,7-disulfonic acid, 1-amino-3-methylbenzene, 1-amino-2-methoxy-5-methylbenzene, 1-amino-2,5-dimethylbenzene, 3-aminophenylurea, 1-amino-3-acetylaminobenzene, 1-amino-3-hydroxyacetylaminobenzene, 1,3-diaminobenzene-4-sulfonic acid, 1-aminonaphthalene-6- or -8-sulfonic acid, 1-amino-2-methoxynaphthalene-6-sulfonic acid, 2-aminonaphthalene-5,7-disulfonic acid, 1-amino-8-hydroxynaphthalene-4-sulfonic acid, 1-amino-8-hydroxynaphthalene-6-sulfonic acid, 1-amino-8-hydroxynaphthalene-2,4-disulfonic acid, 2-hydroxy-3-aminonaphthalene-5,7-disulfonic acid, 1-amino-8-hydroxynaphthalene-2,4,6-trisulfonic acid, 1-hydroxy-8-acetylaminonaphthalene-3-sulfonic acid, 1-benzoylamino-8-hydroxynaphthalene-3,6-or -4,6-disulfonic acid, 2-benzoylamino-5-hydroxynaphthalene-7-sulfonic acid, 2-amino-5-hydroxynaphthalene-7-sulfonic acid, 2-methyl- or 2-ethyl-amino-5-hydroxynaphthalene-7-sulfonic acid, 2-(N-acetyl-N-methylamino)-5-hydroxynaphthalene-7-sulfonic acid, 2-acetylamino-5-hydroxynaphthalene-7-sulfonic acid, 2-amino-5-hydroxynaphthalene-1,7-disulfonic acid, 2-amino-8-hydroxynaphthalene-6-sulfonic acid, 2-methyl- or 2-ethyl-amino-8-hydroxynaphthalene-6-sulfonic acid, 2-(N-acetyl-N-methylamino)-8-hydroxynaphthalene-6-sulfonic acid, 2-acetylamino-8-hydroxynaphthalene-6-sulfonic acid, 2-amino-8-hydroxynaphthalene-3,6-disulfonic acid, 2-acetylamino-8-hydroxynaphthalene-3,6-disulfonic acid, 1-amino-5-hydroxynaphthalene-7-sulfonic acid, 1-amino-8-hydroxynaphthalene-3,6-or -4,6-disulfonic acid, 1-acetylamino-8-hydroxynaphthalene-3,6- or -4,6-disulfonic acid, 1-(4'-aminobenzoylamino)-8-hydroxynaphthalene-3,6-or -4,6-disulfonic acid, 1-(4'-nitrobenzoylamino)-8-hydroxynaphthalene-3,6-or -4,6-disulfonic acid, 1-(3'-aminobenzoylamino)-8-hydroxynaphthalene-3,6-or -4,6-disulfonic acid, 1-(3'-nitrobenzoylamino)-8-hydroxynaphthalene-3,6-or -4,6-disulfonic acid, 2-(4'-amino-3'-sulfophenylamino)-5-hydroxynaphthalene-7-sulfonic acid, 3-methylpyrazol-5-one, 1-phenyl-3-methylpyrazol-5-one, 1-(4'-sulfophenyl)-3-methylpyrazol-5-one, 1-(4'-sulfophenyl)pyrazol-5-one-3-carboxylic acid, 1-(3'-aminophenyl)-3-methylpyrazol-5-one, 1-(2',5'-disulfophenyl)-3-methylpyrazol-5-one, 1-(2'-methyl-4'-sulfophenyl)pyrazol-5-one-3-carboxylic acid, 1-(4',8'-disulfonaphth-2'-yl)-3-methylpyrazol-5-one, 1-(5',7'-disulfonaphth-2'-yl)-3-methylpyrazol-5-one, 1-(2',5'-dichloro-4'-sulfophenyl)-3-methylpyrazol-5-one, 3-aminocarbonyl-4-methyl-6-hydroxypyrid-2-one, 1-ethyl-3-cyano- or -3-chloro-4-methyl-6-hydroxypyrid-2-one, 1-ethyl-3-sulfomethyl-4-methyl-6-hydroxypyrid-2-one, 2,4,6-triamino-3-cyanopyridine, 2-(3'-sulfophenylamino)-4,6-diamino-3-cyanopyridine, 2-(2'-hydroxyethylamino)-3-cyano-4-methyl-6-aminopyridine, 2,6-bis(2'-hydroxyethylamino)-3-cyano-4-methylpyridine, 1-ethyl-3-carbamoyl-4-methyl-6-hydroxypyrid-2-one, 1-ethyl-3-sulfomethyl-4-methyl-5-carbamoyl-6-hydroxypyrid-2-one, N-acetoacetylaminobenzene, 1-(N-acetoacetylamino)-2-methoxybenzene-5-sulfonic acid, 4-hydroxyquinol-2-one, 1-amino-8-hydroxy-2-(phenylazo)naphthalene-3,6-disulfonic acid, 1-amino-8-hydroxy-2-(4'-sulfophenylazo)naphthalene-3,6-disulfonic acid, 1-amino-8-hydroxy-2-(2',5'-disulfophenylazo)naphthalene-3,6-disulfonic acid, 1-β-amino-ethyl-3-cyano-4-methyl-6-hydroxypyrid-2-one, 1-γ-aminopropyl-3-sulfomethyl-4-methyl-6-hydroxypyrid-2-one, 1,3-diaminobenzene, 1-amino-3-N,N-di-β-hydroxyethylaminobenzene, 1-amino-3-N,N-di-β-sulfatoethylaminobenzene, 1-amino-3-N,N-di-β-hydroxyethylamino-4-methoxybenzene, 1-amino-3-N,N-di-β-sulfatoethylamino-4-methoxybenzene, 1-amino-3-sulfobenzylaminobenzene, 1-amino-3-sulfobenzylamino-4-chlorobenzene, 1-amino-3-N,N-disulfobenzylaminobenzene, N,N-di(β-sulfatoethyl)aniline, 3-acetylamino-N,N-di(β-sulfatoethyl)aniline, 3-methyl-N,N-di(β-sulfatoethyl)aniline, N-ethyl-N-(β-hydroxyethyl)aniline, N-ethyl-N-(β-acetoxyethyl)aniline, 3-acetylamino-N,N-di(β-hydroxyethyl)aniline, 3-methyl-N,N-di(β-acetoxyethyl)aniline, 2-methoxy-5-acetylamino-N-(β-acetoxyethyl)-N-benzylaniline, 2-chloro-5-acetylamino-N-(γ-phenoxy-β-hydroxy-n-propyl)aniline, 3-ureidoaniline, N-ethyl-N-(3'-sulfobenzyl)aniline, 3-methyl-N-ethyl-N-(β-sulfatoethyl)aniline, 3-methyl-N,N-di(β-hydroxyethyl)aniline and 3-methyl-6-methoxy-N,N-di(β-hydroxyethyl)aniline.

If the reactive dyes of the invention have the formula (6) or (7) and accordingly Fa in formula (1) is the radical of a monoazo or disazo compound, this radical can be derived e.g. from the following organic monoazo or disazo dyes:

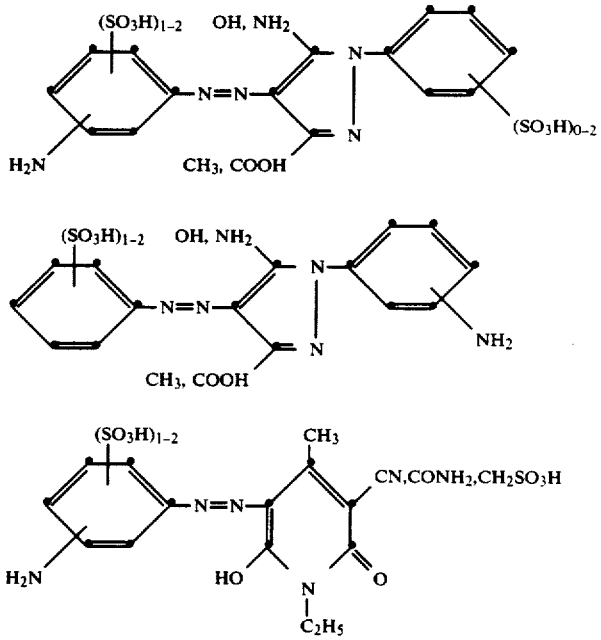

-continued
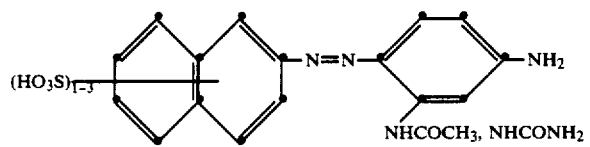
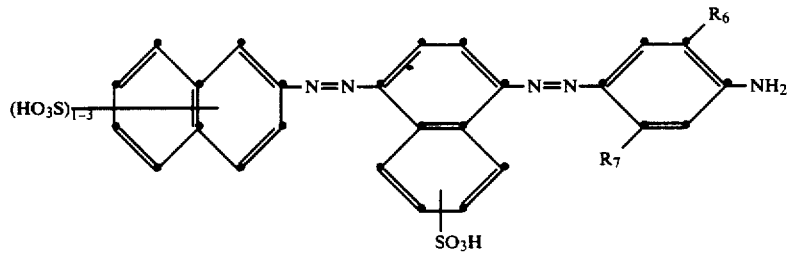
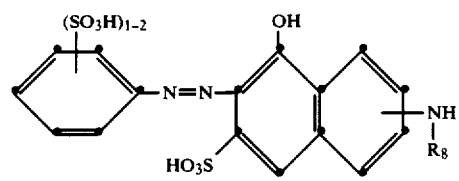
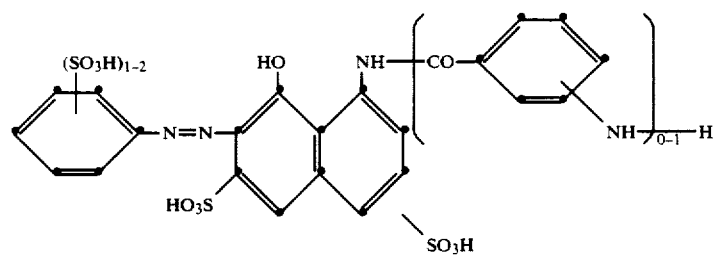
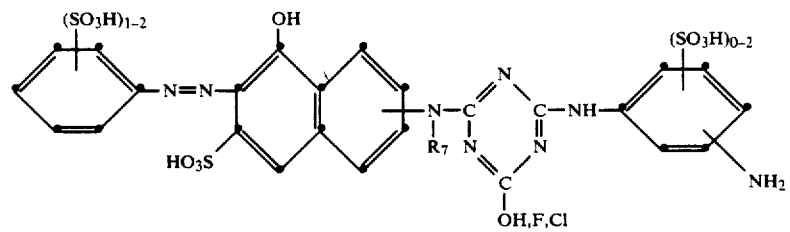
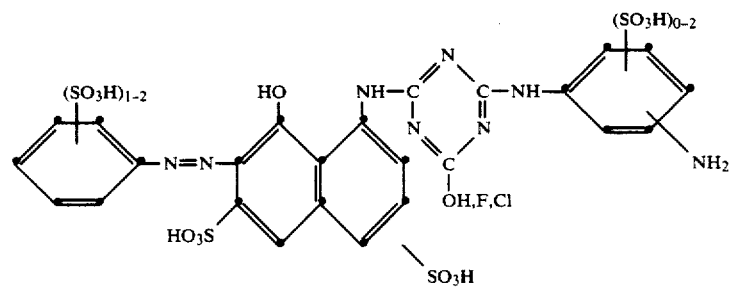
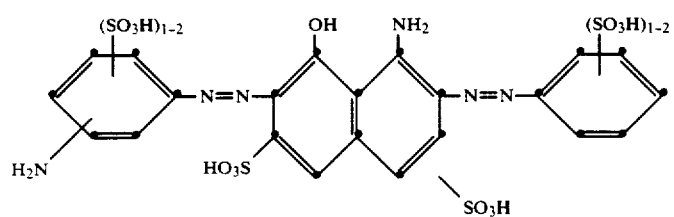

-continued
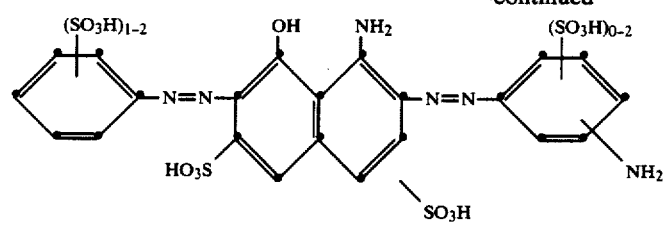
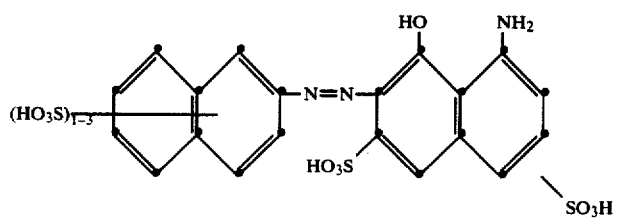
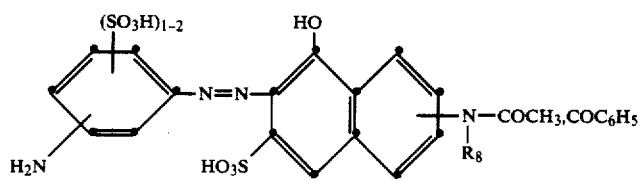
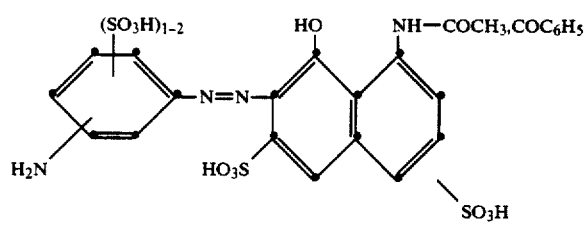
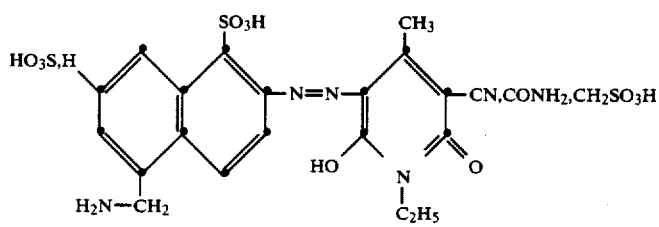
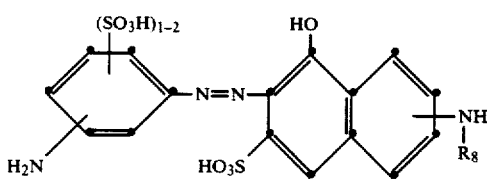
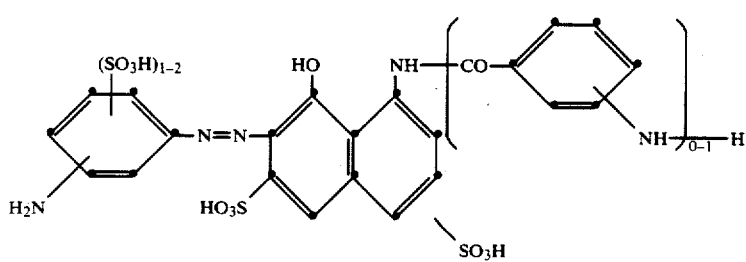

-continued
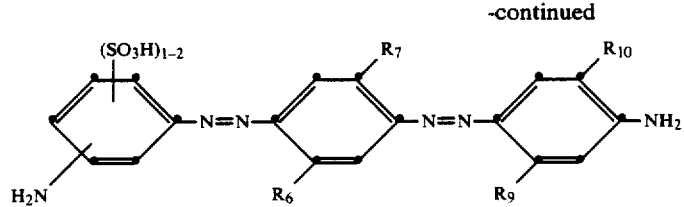
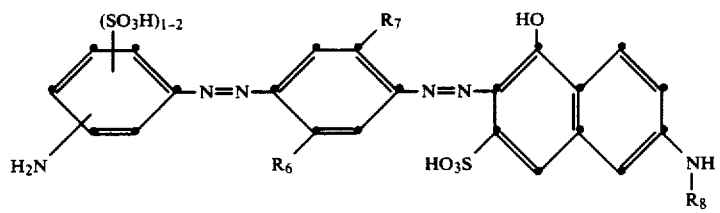
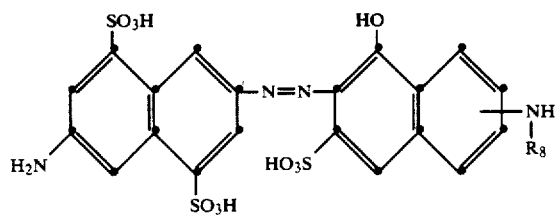
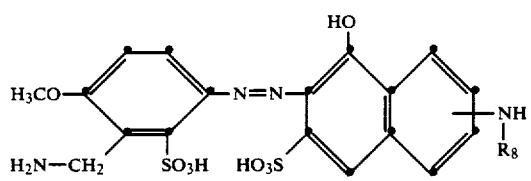
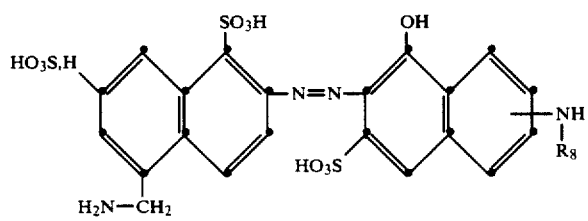
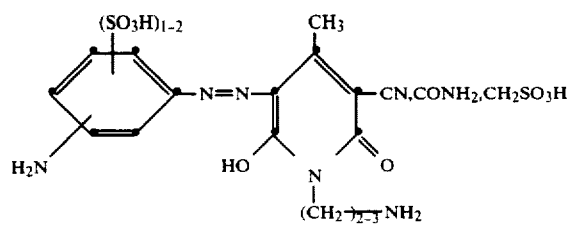
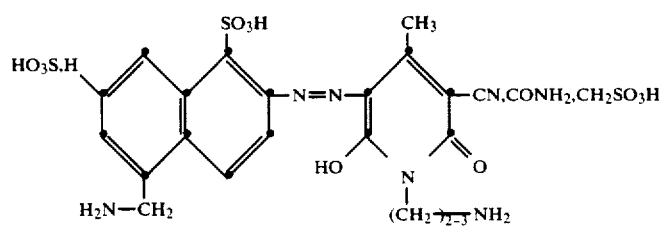

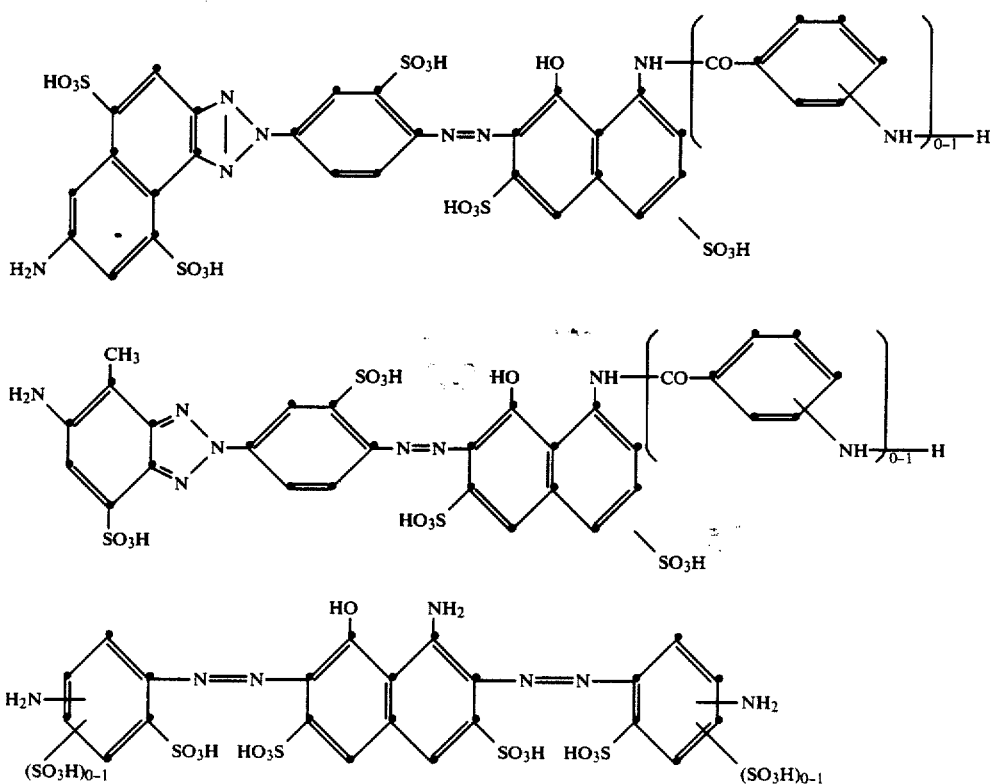

In the formulae listed above, $R_6$, $R_7$, $R_9$ and $R_{10}$ independently of one another are e.g. hydrogen, $C_1$–$C_4$alkyl, $C_1$–$C_4$alkoxy, $C_1$–$C_4$-alkanoylamino, ureido or halogen and $R_8$ is e.g. hydrogen or $C_1$–$C_4$-alkyl.

b) Metal complexes of monoazo or disazo dyes of formula (6) or (7) above which contain groups capable of metal complex formation, e.g. hydroxyl, carboxyl, amino or sulfo groups.

If Fa in formula (1) is the radical of a metal complex azo dye, it can be derived e.g. from a metal complex of the dyes given below:

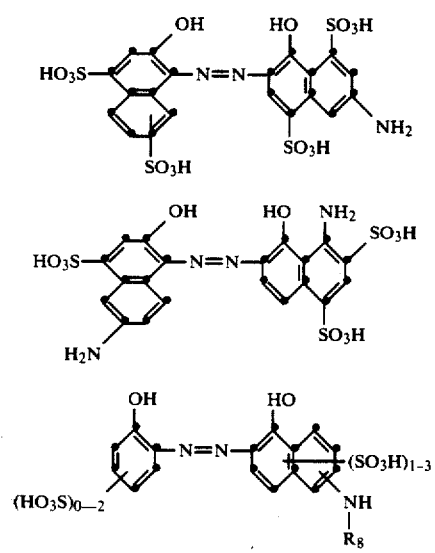

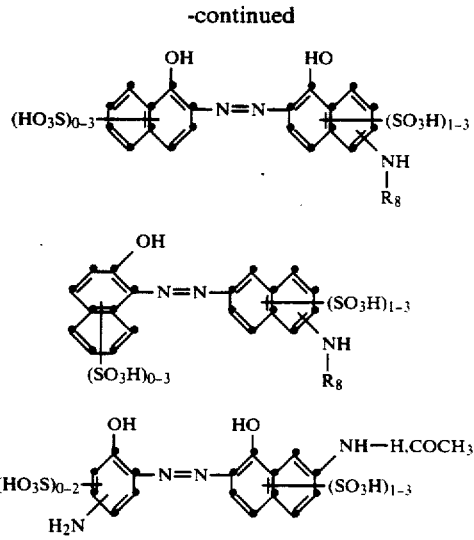

wherein $R_8$ is in each case as defined above.

Preferred metal atoms are Cu (1:1 complex) or Cr and Co (1:2 complex).

The azo compound of the formula given above can occur once or twice in Cr and Co complexes, i.e. these complexes can have a symmetrical structure or an unsymmetrical structure with any other ligands.

Examples of suitable copper complex dyes which can be based on the radical Fa in formula (1) are:

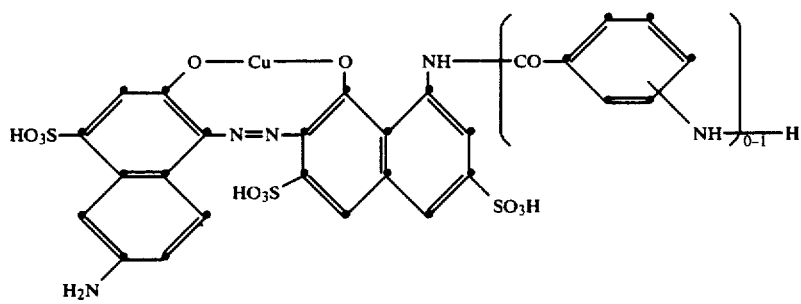
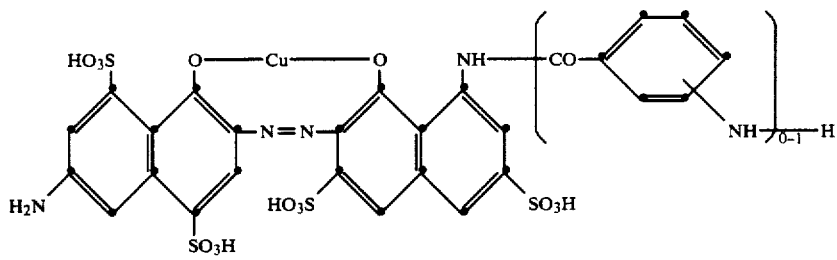
(c) Anthraquinone dyes of the formula
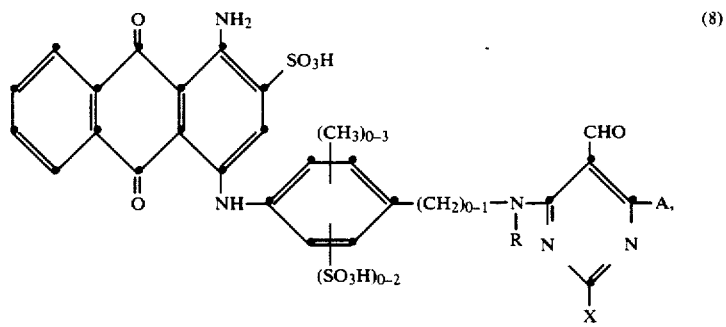
(8)
wherein R, A and X are each as defined above.
(d) Formazane dyes of the formula
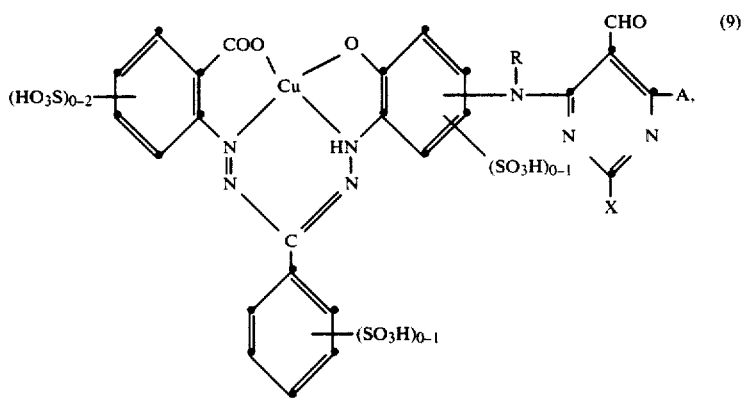
(9)
wherein R, A and X each have the meanings and preferences indicated previously.
(e) Phthalocyanine dyes of the formula

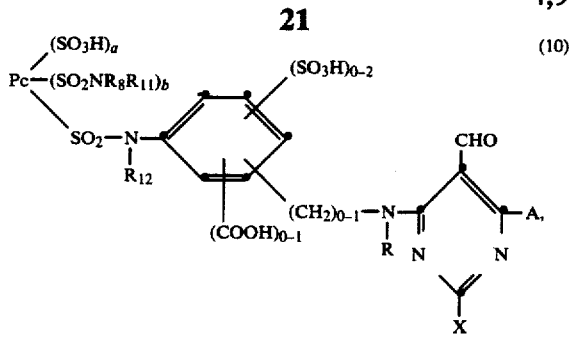

wherein R, A and X are each as defined above, Pc is the radical of a Cu or Ni phthalocyanine, $R_8$, $R_{11}$ and $R_{12}$ independently of one another are $C_1$–$C_4$ alkyl and, in particular hydrogen, and a and b are integers or fractions from 1 to 3, the sum of a and b being 3.0.

(f) Reactive dyes of formula (1) wherein Fa is e.g. a radical of a dioxazine dye of the formula

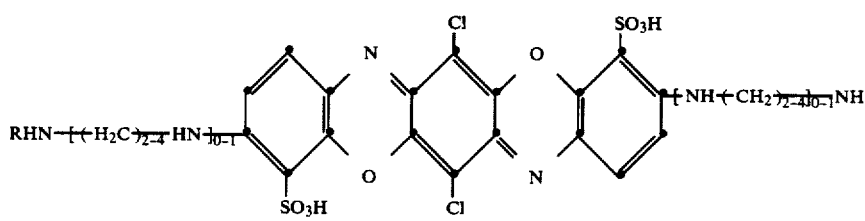

wherein R is as defined above.

The reactive dyes of the invention can be prepared e.g. by condensing organic dyes of the formula

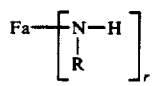

or dye precursors, at least one equivalent of a pyrimidine of the formula

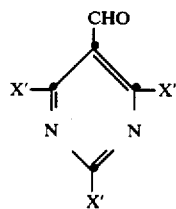

and at least one equivalent of an amine of the formula

in any order, to give a reactive dye of formula (1), wherein Fa, R, R', R'' and r are each as defined above and each X' has the meaning of X as a substituent removable as an anion, and, if dye precursors are used, converting these into the desired final dyes.

The process of the invention may be followed by a further conversion reaction. When the final dyes are prepared from precursors, these reactions are, in particular, coupling reactions yielding azo dyes.

As the order may differ in which the individual process steps described above are carried out, different variants of the process are possible. In general, the reaction is carried out stepwise in succession with the sequence of the simple reactions between the individual reaction components conveniently depending on the particular conditions. As a halopyrimidine radical will hydrolyze under certain conditions, an intermediate containing acetylamino groups must be saponified, to eliminate the acetyl groups, before the condensation reaction with a halopyrimidine is carried out. Which reaction is best carried out first in the preparation of a secondary condensation product of an amine of formula (2'), the pyrimidine of formula (13) and the organic dye of formula (12) or a precursor, i.e. whether the reaction of the pyrimidine with the amine or the reaction of the pyrimidine with the organic dye or a precursor of the dye, differs from case to case and depends especially on the solubility of the amino compounds employed and the basicity of the amino groups to be acylated. Another possible conversion reaction is a subsequent reaction on the radical X'. If desired, removable radicals X' can be exchanged for other removable radicals after the pyrimidine of formula (13) has been condensed with a dye of formula (12) or a dye precursor. Thus one halogen atom can be replaced by another, for example by reaction with a halogenating agent. Reaction with tertiary bases, such as trimethylamine, pyridine or 1,4-diazabicyclo[2,2,2]octane, gives corresponding ammonium compounds and quaternization with hydrazines, such as N,N-dimethylhydrazine, gives corresponding hydrazinium compounds. With sulfites, e.g. sodium sulfite, and sulfinates it is possible to replace halogen by the sulfo groups or a sulfonyl group, e.g. the 3'-carboxyphenylsulfonyl group and the like. Reaction with cyanides, e.g. potassium cyanide, and thiocyanates, e.g. potassium thiocyanate makes it possible to replace chlorine by the nitrile or thiocyanate group, which are also reactive. Furthermore, reaction with sodium azide or compounds containing reactive methylene groups, e.g. ethyl cyanoacetate, ethyl malonate and acetylacetone, also makes it possible to replace halogen atoms or other reactive groups by the corresponding radicals. In many cases the replacement of a removable substituent X' by another removable substituent can also be effected before the pyrimidine of formula (13) is condensed with a dye of formula (12) or a dye precursor.

The synthesis can also be followed by elimination reactions. For example, reactive dyes of formula (1) containing sulfatoethylsulfonyl radicals can be treated with dehydrohalogenating agents such as sodium hydroxide, in which reaction the sulfatoethylsulfonyl radicals are converted into vinylsulfonyl radicals. A modified embodiment of the process comprises first preparing a dye containing a precursor of the reactive radical and then converting this precursor into the reactive radical itself, e.g. by esterification or an addition reaction. For example, it is possible to prepare a dye wherein Z is the radical HO—CH$_2$CH$_2$— and to react the intermediate with sulfuric acid, before or after acylation, so that the hydroxyl group is converted into the sulfato group. An alternative procedure is to use an analogous dye wherein Z is the vinyly group, H$_2$C=CH—, and to effect addition of thiosulfuric acid to the intermediate to form the radical HO$_3$SS—CH$_2$CH$_2$—. The hydroxyl group in dye of formula (1) or a suitable precursor is sulfated, e.g. by reaction with concentrated sulfuric acid in the range from 0° C. to a moderately elewated temperature. Sulfation can also be carried out by reacting the hydroxyl compound with two equivalents of chlorosulfonic acid per hydroxyl group, in a polar organic solvent such as N-methylpyrrolidone, in the temperature range from 10° to 80° C. Sulfation is preferably carried out by adding the compound in question to sulfuric acid monohydrate in the temperature range from 5° to 15° C. The introduction of another radical Y removable under alkaline conditions into a compound of formula (1) or an intermediate, instead of the sulfato group, for example the introduction of a thiosulfato group, is carried out in a manner known per se. In many cases the preparative route via a precursor of the reactive radical proceeds homogeneously and to completion.

The process variant which starts from dye precursors is suitable for the preparation of reactive dyes of formula (1), wherein Fa is the radical of a dye composed of two or more than two components. Examples of such dyes composed of two or more than two components are: monoazo, disazo, trisazo, metal complex azo, formazane and azomethine dyes. In principle all classes of reactive dyes of formula (1) can be prepared in a manner known per se or by methods analogous to known ones by starting from dye precursors or intermediates containing fibre-reactive radicals according to formula (1), or by introducing these fibre-reactive radicals into intermediates of dyestuff character suitable for this purpose. If the starting materials are dye precursors, the reactive dyes of formula (1) are obtained e.g. by condensing one component of the dye of formula (12) containing a group —N(R)H with a pyrimidine of formula (13), the latter being condensed with an amine of formula (2') before or after this reaction, and reacting the product with the other component of the dye of formula (12). In the preparation of the preferred azo dyes, the diazo components and the coupling components must together have at least one amino group —N(R)H and the diazo components must also contain an amino group, —NH$_2$. The diazo components used in this case are, in particular, 1,3-phenylenediamine-4-sulfonic acid, 1,4-phenylenediamine-2-sulfonic acid, 1,4-phenylenediamine-2,5-disulfonic acid or 1,3-phenylenediamine-4,6-disulfonic acid. In some cases, corresponding acetylamino or nitro compounds are used, the acetylamino or nitro group being converted to the H$_2$N-group by saponification or reduction before the condensation reaction with the 2,4,6-trihalogenopyrimidine.

If the reactive dyes contain groups capable of metal complex formation, such as hydroxyl, carboxyl, amino or sulfo, said dyes can also be metallized subsequently. For example, metal complex azo dyes are obtained by treating resultant azo compounds which contain complex forming groups in the ortho, ortho' positions relative to the azo bridge, e.g. hydroxyl or carboxyl groups, with heavy metal doners, which treatment is carried out before or, in some cases, after the condensation reaction with the 2,4,6-trihalogenopyrimidine of formula (13). Copper complexes of reactive dyes of formula (1) are of particular interest. Other possible methods of metallization, apart from the one mentioned above, are dealkylating metallization and, for the preparation of copper complexes, oxidising coppering.

The most important process variants are illustrated in the Examples of embodiments of the invention.

The compounds of formula (12) are known or can be prepared in a manner known per se. A selection of useful compounds of formula (12) can be found in the discussion of the preferred subgroups of the reactive dyes of the invention.

The pyrimidine compounds of formula (13) are also known, e.g. from German Offenlegungsschrift No. 2 310 334 or they can be prepared by a method similar to that disclosed therein.

The compounds of formula (2') are known per se or can be prepared by processes analogous to known ones.

Amines of formula (2') containing a reactive radical are known, e.g. from European patent application No. A 0 141 776, 0 144 766 or 0 159 292, or they can be prepared by methods similar to those disclosed therein.

The reactive dyes of the invention of formula (1) are suitable for dyeing and printing a very wide range of materials such as silk, leather, wool and polyamide fibres, and especially cellulosic fibre materials of all kinds. Such fibre materials are, for example, the natural cellulose fibres such as cotton, linen and hemp, as well as pulp and regenerated cellulose. The reactive dyes of the invention are also suitable for dyeing or printing fibres which contain hydroxyl groups and which are components of blended fabrics, e.g. blends of cotton with polyester fibres or polyamide fibres.

The dyes of formula (1) can be applied in various ways to the fibre material and fixed thereon, especially in the form of aqueous dye solutions and printing pastes. The dyes of formula (1) are suitable both for the exhaust process and for dyeing by the pad dyeing process, in which the goods are impregnated with aqueous dye solutions which may also contain salts, and the dyes are fixed after treatment with alkali, or in the presence of alkali, with or without the application of heat. The dyes of formula (1) are particularly suitable for the so-called cold pad-batch process, which comprises applying the dye together with the alkali to the pad and subsequently fixing the dye by storing the impregnated goods for several hours at room temperature. After fixation the dyeings or prints are thoroughly rinsed with cold and hot water, if necessary with the addition of a compound which acts as a dispersant and promotes the diffusion of non-fixed dye.

The reactive dyes of the invention are distinguished by high reactivity, good fixation and good build-up. They can therefore be applied by the exhaust dyeing process at low dyeing temperatures and require only short steaming times when used in the pad-steam process. The degrees of fixation are high and non-fixed dye can be readily washed off. The difference between degree of exhaustion and degree of fixation is remarkably small, i.e. the soap loss is very small. The reactive dyes of the invention are also particularly suitable for printing, especially on cotton, and for printing nitrogen-containing fibres, e.g. wool, silk or blended fabrics containing wool or silk.

The dyeings and prints prepared with the dyes of the invention of formula (1) on cellulose fibre materials have high colour strength and high dye-fibre bond stability both in acid and in alkaline medium, and they also have good lightfastness and very good wetfastness properties such as fastness to washing, water, sea-water, cross-dyeing and perspiration, as well as good fastness to pleating, ironing and rubbing.

The following Examples will serve to illustrate the invention. The temperatures are given in degrees Celsius and the parts and percentages are by weight, unless stated otherwise. The ratio of parts by weight to parts by volume is the same as that of kilograms to litres.

EXAMPLE 1

14.9 g of the chromophore of the formula

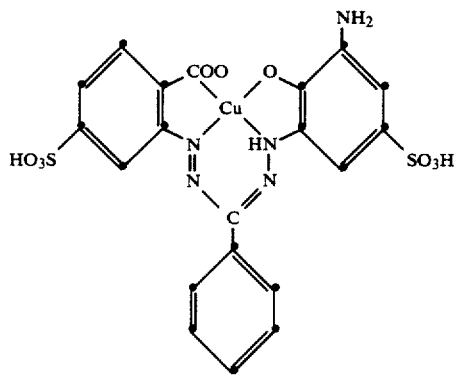

are dissolved in 150 ml of water to give a neutral solution and 6.3 g of 2,4,6-trichloro-5-formylpyrimidine in 70 ml of acetone are added dropwise to this solution at a temperature of 0°–5° C., while keeping the pH between 6 and 7 by the dropwise addition of 2 N sodium hydroxide solution. When acylation is complete, a neutral solution of 4.5 g of 3-aminobenzenesulfonic acid in 20 ml of water is added dropwise at 25°–30° C., while keeping the pH between 6 and 7 by the addition of 2 N sodium hydroxide solution. After stirring for one hour at 35° C., the dye is salted out with sodium chloride and then isolated by filtration, stabilized with disodium hydrogenphosphate and dried under vacuum.

The resulting dye of the formula

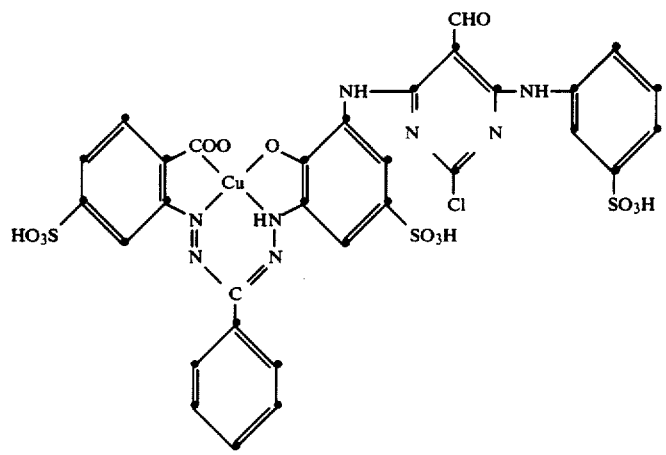

dyes cotton in blue shades with good general fastness properties,

EXAMPLE 2

13.6 g of the chromophore of the formula

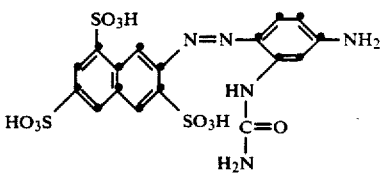

are dissolved in 150 ml of water to give a neutral solution and acylated at pH 6–6.5 and a temperature of 0°–5° C. with a solution of 6 g of 2,4,6-trichloro-5-formylpyrimidine in 25 ml of acetone, while keeping the pH of the reaction mixture at 6–6.5 by the dropwise addition of 2 N sodium hydroxide solution. The dye solution is clarified by filtration and then reacted with a solution of 7.7 g of 2-(3-aminophenylsulfonyl)ethyl hydrogensulfate in 150 ml of water at pH 5–5.5 and a temperature of 25° C. The reaction solution is subsequently adjusted to pH 10 with 2 N sodium hydroxide solution and vinylated for 20 minutes. The dye is salted out with potassium chloride, isolated by filtration, stabilized with disodium hydrogenphosphate solution and dried under vacuum. The resulting reactive dye of the formula

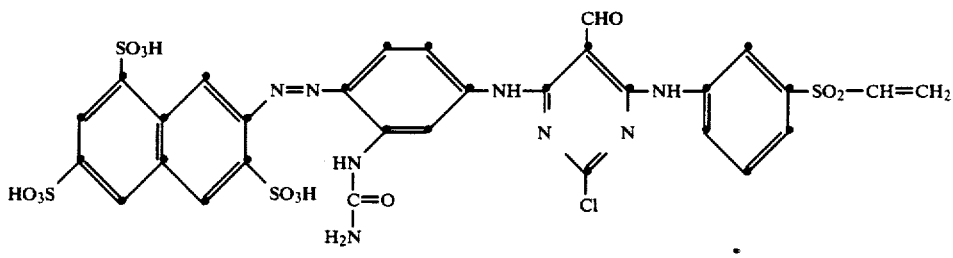

dyes cotton in golden yellow shades with good general fastness properties.

ples, affording analogous dyes which dye cotton in the shades indicated in the last column of the table.

TABLE 1

| Example no. | Chromophore | Amine | Shade on cotton |
|---|---|---|---|
| 3 | | | greenish yellow |
| 4 | | | golden yellow |

EXAMPLES 3–4

The procedure described in Example 1 or 2 is repeated, using the chromophores and aromatic amines listed in Table 1 instead of those used in the said Examples.

EXAMPLES 5–59

Condensation of 2,4,6-trichloro-5-formylpyrimidine with the dyes containing amino groups and the amines listed in Table 2, in accordance with the procedure described in Examples 1 and 2, affords further reactive dyes which dye cotton in the indicated shades:

TABLE 2

| Example no. | Dye | Amine | Shade on cotton |
|---|---|---|---|
| 5 | (naphthalene-azo structure with OH, SO₃H, HO₃S, and CH₃O-phenyl with NH₂) | 1-aminobenzene-3-β-sulfatoethyl-sulfone | scarlet |
| 6 | (pyridone azo dye with HO₃S-phenyl-NH₂, CH₃, H₂NCO, OH, N-C₂H₅) | 1-aminobenzene-4-β-sulfatoethyl-sulfone | greenish yellow |
| 7 | (pyridone azo dye with HO₃S-phenyl-NH₂, CH₃, H₂NCO, OH, N-C₂H₅) | β-(β-chloroethyl-sulfonyl)ethylamine | greenish yellow |
| 8 | (pyridone azo dye with HO₃S-phenyl-NH₂, CH₃, HO₃SCH₂, OH, N-C₂H₅) | β-(β-chloroethyl-sulfonyl)ethylamine | greenish yellow |

TABLE 2-continued

| Example no. | Dye | Amine | Shade on cotton |
|---|---|---|---|
| 9 | Naphthalene-based azo dye with SO₃H, OH, NH₂, and HO₃S substituents | β-(β-chloroethyl-sulfonyl)ethylamine | orange |
| 10 | Azo dye with HO₃S, NH₂, OH, CH₃, SO₃H, HO₃S substituents on naphthalene | 1-aminobenzene-3-β-sulfatoethylsulfone | yellow |
| 11 | Azo dye with HO₃S, NH₂, OH, CH₃, SO₃H, HO₃S substituents on naphthalene | β-(β-chloroethyl-sulfonyl)ethylamine | yellow |

TABLE 2-continued

| Example no. | Dye | Amine | Shade on cotton |
|---|---|---|---|
| 12 | HO₃S–C₆H₃(NH₂)–N=N–C(COOH)=C(OH)–N(C₆H₄SO₃H) (pyrazolone azo dye) | β-(β-chloroethyl-sulfonyl)propylamine | yellow |
| 13 | HO₃S–C₆H₃(NH₂)–N=N–C(COOH)=C(OH)–N(C₆H₄SO₃H) (pyrazolone azo dye) | bis[β-(β-chloroethyl-sulfonyl)ethyl]amine | yellow |
| 14 | H₂N–C₆H₃(SO₃H)–N=N–naphthalene(OH)(NH₂)(SO₃H) (H-acid azo dye) | bis[β-(β-chloroethyl-sulfonyl)ethyl]amine | bluish red |

TABLE 2-continued

| Example no. | Dye | Amine | Shade on cotton |
|---|---|---|---|
| 15 | (structure with CH₃O, SO₃H, N=N, OH, HO₃S, NHCH₃) | β-(β-sulfatoethyl-sulfonyl)ethylamine | scarlet |
| 16 | (structure with SO₃H, HO₃S, N=N, SO₃H, NH₂, NHCONH₂) | β-(β-sulfatoethyl-sulfonyl)ethylamine | golden yellow |
| 17 | (structure with SO₃H, OH, N=N, HO₃S, SO₃H, NH₂) | β-vinylsulfonyl-ethylamine | orange |
| 18 | (structure with SO₃H, OH, N=N, HO₃S, SO₃H, NH₂) | β-(β-chloroethyl-sulfonyl)ethylamine | orange |

TABLE 2-continued

| Example no. | Dye | Amine | Shade on cotton |
|---|---|---|---|
| 19 | (structure) | β-(β-chloroethyl-sulfonyl)ethylamine | bluish red |
| 20 | (structure) | β-(β-chloroethyl-sulfonyl)ethylamine | blue |
| 21 | (structure) | bis[β-(β-chloroethyl-sulfonyl)ethyl]amine | brown |

TABLE 2-continued

| Example no. | Dye | Amine | Shade on cotton |
|---|---|---|---|
| 22 | | β-(β-sulfatoethyl-sulfonyl)ethylamine | yellow |
| 23 | | N-methyl-N-β-(β-chloroethylsulfonyl)-ethylamine | bluish red |
| 24 | | β-(β-sulfatoethyl-sulfonyl)ethylamine | dark blue |
| 25 | | β-(β-sulfatoethyl-sulfonyl)ethylamine | greenish navy blue |
| 26 | | β-(β-sulfatoethyl-sulfonyl)ethylamine | greenish blue |

TABLE 2-continued

| Example no. | Dye | Amine | Shade on cotton |
|---|---|---|---|
| 27 | (copper complex azo dye structure with NH₂, SO₃H, HO₃S groups) | β-(β-sulfatoethyl-sulfonyl)ethylamine | violet |
| 28 | (copper complex azo dye structure with NH₂, SO₃H, HO₃S groups) | β-vinylsulfonylethyl-amine | blue |
| 29 | (copper complex azo dye structure with NH₂, SO₃H, HO₃S groups) | 1-aminobenzene-3-vinylsulfone | reddish blue |

TABLE 2-continued

| Example no. | Dye | Amine | Shade on cotton |
|---|---|---|---|
| 30 | [Cu complex azo dye structure with NH₂, SO₃H, COO, HO₃S groups] | 1-aminobenzene-4-β-sulfatoethylsulfone | blue |
| 31 | [Anthraquinone dye structure with NH₂, SO₃H, NH groups] | β-(β-chloroethyl-sulfonyl)ethylamine | greenish blue |
| 32 | [Anthraquinone dye structure with NH₂, SO₃H, CH₃, NH groups] | β-(β-chloroethyl-sulfonyl)ethylamine | royal blue |

TABLE 2-continued

| Example no. | Dye | Amine | Shade on cotton |
|---|---|---|---|
| 33 | (anthraquinone structure with NH₂, SO₃H, H₃C, NH, CH₃, SO₃H, H₃C, NH₂) | β-(β-thiosulfato-ethylsulfonyl)-ethylamine | royal blue |
| 34 | (anthraquinone structure with NH₂, SO₃H, H₃C, NH, CH₃, SO₃H, H₃C, NH₂) | β-(β-acetoxyethyl-sulfonyl)ethylamine | royal blue |
| 35 | (azo structure with NH₂, phenyl–N=N–naphthyl with SO₃H groups) | β-(β-acetoxyethyl-sulfonyl)ethylamine | yellow |
| 36 | (azo naphthol structure with NH₂, SO₃H, HO, N=N, HO₃S, SO₃H groups) | β-(β-acetoxyethyl-sulfonyl)ethylamine | bluish red |

TABLE 2-continued

| Example no. | Dye | Amine | Shade on cotton |
|---|---|---|---|
| 37 | (structure: disazo dye with chloro-triazinyl linker, naphthalene sulfonic acid groups, aminobenzene sulfonic acid) | β-(β-sulfatoethyl-sulfonyl)ethylamine | bluish red |
| 38 | (structure: azo dye with NHCO-phenyl, naphthol disulfonic acid, aminobenzenesulfonic acid) | β-(β-sulfatoethyl-sulfonyl)ethylamine | bluish red |
| 39 | CuPc-(SO$_3$H)(SO$_2$NH$_2$)(SO$_2$NH–C$_6$H$_4$–NH$_2$)$_3$ all 3 - CuPc | β-(β-sulfatoethyl-sulfonyl)ethylamine | turquoise |
| 40 | CuPc-(SO$_3$H)(SO$_2$NH$_2$)(SO$_2$NH–C$_6$H$_4$(SO$_3$H)–NH$_2$)$_{2.8}$ all 3 - CuPc | β-(β-sulfatoethyl-sulfonyl)ethylamine | turquoise |

TABLE 2-continued

| Example no. | Dye | Amine | Shade on cotton |
|---|---|---|---|
| 41 | (structure) | β-(β-acetoxyethyl-sulfonyl)ethylamine | red |
| 42 | (structure) | β-(β-acetoxyethyl-sulfonyl)ethylamine | yellow |
| 43 | (structure) | β-(β-chloroethyl-sulfonyl)ethylamine | yellow |
| 44 | (structure) | β-(β-sulfatoethyl-sulfonyl)ethylamine | blue |
| 45 | (structure) | β-(β-chloroethyl-sulfonyl)ethylamine | yellow |

TABLE 2-continued

| Example no. | Dye | Amine | Shade on cotton |
|---|---|---|---|
| 46 | (structure) | 1-aminobenzene-4-β-sulfatoethylsulfone | yellow |
| 47 | (structure) | 1-aminobenzene-4-β-sulfatoethylsulfone | blue |
| 48 | (structure) | β-(β-sulfatoethyl-sulfonyl)ethylamine | bluish red |
| 49 | (structure) | β-(β-sulfatoethyl-sulfonyl)ethylamine | yellow |

TABLE 2-continued

| Example no. | Dye | Amine | Shade on cotton |
|---|---|---|---|
| 50 | (structure) | β-(β-chloroethyl-sulfonyl)ethylamine | navy blue |
| 51 | (structure) | bis[β-(β-chloroethyl-sulfonyl)ethyl]amine | bluish red |
| 52 | (structure) | 1-aminobenzene-3-β-sulfatoethylsulfone | bluish red |
| 53 | (structure) | 1-aminobenzene-3-β-sulfatoethylsulfone | navy blue |
| 54 | (structure) | β-(β-chloroethyl-sulfonyl)ethylamine | bluish red |

TABLE 2-continued

| Example no. | Dye | Amine | Shade on cotton |
|---|---|---|---|
| 55 | (structure with HO₃SOCH₂CH₂SO₂-, azo groups, OH, NH₂, HO₃S, SO₃H, NH₂) | β-(β-chloroethyl-sulfonyl)ethylamine | navy blue |
| 56 | (structure with Cl(CH₂)₂SO₂(CH₂)₃CONH-, azo groups, NH₂, OH, SO₃H, HO₃S) | β-(β-chloroethyl-sulfonyl)ethylamine | red |
| 57 | (structure with phenyl-NHCO(CH₂)₃-SO₂-CH₂-CH₂-Cl, OCH₃, H₃C, azo groups, NH₂, OH, SO₃H, HO₃S) | H₂N—⟨phenyl⟩—NHCO(CH₂)₃—SO₂—CH₂—CH₂—Cl | blue |
| 58 | (structure with azo groups, NH₂, OH, SO₃H, HO₃S) | N-[2-β-chloroethyl-sulfonyl)ethyl]ethylene-diamine | red |
| 59 | (structure with azo groups, NH₂, OH, SO₃H, HO₃S) | piperazine N—CH₂CH₂SO₂CH₂CH₂Cl | red |

DYEING PROCEDURE I 2 parts of the dye obtained in Example 1 are dissolved in 400 parts of water. To this solution are added 1500 parts of a solution containing 53 g of sodium chloride per liter. 100 parts of a cotton fabric are put into this dyebath at 40° C. and, after 45 minutes, 100 parts of a solution containing 16 g of sodium hydroxide and 20 g of calcined sodium carbonate per liter are added. The temperature of the dyebath is kept at 40° C. for a further 45 minutes. The dyed goods are then rinsed, soaped at the boil for a quarter of an hour with a non-ionic detergent, rinsed again and dried.

DYEING PROCEDURE II 2 parts of the reactive dye obtained in Example 1 are dissolved in 400 parts of water. To this solution are added 1500 parts of a solution containing 53 g of sodium chloride per liter. 100 parts of a cotton fabric are put into this dyebath at 35° C. and, after 20 minutes, 100 parts of a solution containing 16 g of sodium hydroxide and 20 g of calcined sodium carbonate are added. The temperature of the dyebath is kept at 35° C. for a further 15 minutes. The temperature is then raised to 60° C. over 20 minutes and kept at 60° C. for a further 35 minutes. The dyed goods are then rinsed, soaped at the boil for a quarter of an hour with a non-ionic detergent, rinsed again and dried.

DYEING PROCEDURE III 8 parts of the reactive dye obtained in Example 1 are dissolved in 400 parts of water. To this solution are added 1400 parts of a solution containing 100 g of sodium sulfate per liter. 100 parts of a cotton fabric are put into this dyebath at 25° C. and, after 10 minutes, 200 parts of a solution containing 150 g of trisodium phosphate per liter are added and the temperature of the dyebath is then raised to 60° C. over 10 minutes. The temperature is kept at 60° C. for a further 90 minutes. The dyed goods are then rinsed, soaped at the boil for a quarter of an hour with a non-ionic detergent, rinsed again and dried.

DYEING PROCEDURE IV 4 parts of the reactive dye obtained in Example 1 are dissolved in 50 parts of water. To this solution are added 50 parts of a solution containing 5 g of sodium hydroxide and 20 g of calcined sodium carbonate per liter. A cotton fabric is padded with this liquor to a pick-up of 70% and then rolled up. The cotton fabric is then stored for 3 hours at room temperature. The dyed goods are then rinsed, soaped at the boil for a quarter of an hour with a non-ionic detergent, rinsed again and dried.

DYEING PROCEDURE V 6 parts of the reactive dye obtained in Example 1 are dissolved in 50 parts of water. To this solution are added 50 parts of a solution containing 16 g of sodium hydroxide and 0.04 liter of water glass (38° Bé) per liter. A cotton fabric is padded with this liquor to a pick-up of 70% and then rolled up. The cotton fabric is then stored for 10 hours at room temperature. The dyed goods are then rinsed, soaped at the boil for a quarter of an hour with a non-ionic detergent, rinsed again and dried.

DYEING PROCEDURE VI 2 parts of the reactive dye obtained in Example 1 are dissolved in 100 parts of water with the addition of 0.5 part of sodium m-nitrobenzenesulfonate. A cotton fabric is impregnated with this liquor to a pick-up of 75% and then dried. The fabric is then impregnated with a warm solution, at 20° C., containing 4 g of sodium hydroxide and 300 g of sodium chloride per liter, and pinched off to a pick-up of 75%. The dyeing is steamed for 30 seconds at 100 to 102° C., rinsed, soaped for a quarter of an hour in a 0.3% boiling solution of a non-ionic detergent, rinsed and dried.

PRINTING PROCEDURE I 3 parts of the reactive dye obtained in Example 1 are sprinkled, with rapid stirring, into 100 parts of a stock thickening containing 50 parts of 5% sodium alginate thickening, 27.8 parts of water, 20 parts of urea, 1 part of sodium m-nitrobenzenesulfonate and 1.2 parts of sodium bicarbonate. A cotton fabric is printed with this printing paste and dried. The printed fabric obtained is steamed for 2 minutes at 102° C. in saturated steam and then rinsed, soaped at the boil if necessary, rinsed again and then dried.

PRINTING PROCEDURE II 5 parts of the reactive dye obtained in Example 1 are sprinkled, with rapid stirring, into 100 parts of a stock thickening containing 50 parts of 5% sodium alginate thickening, 36.5 parts of water, 10 parts of urea, 1 part of sodium m-nitrobenzenesulfonate and 2.5 parts of sodium bicarbonate. A cotton fabric is printed with this printing paste, the stability of which meets the technical requirements, and dried. The printed fabric so obtained is steamed for 8 minutes at 102° C. in saturated steam and then rinsed, soaped at the boil if necessary, rinsed again and then dried.

What is claimed is:

1. A reactive dye of the formula

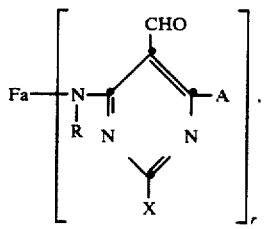

(1)

wherein Fa is a monoazo or polyazo, metal complex azo, anthraquinone, phthalocyanine, formazane, azomethine, dioxazine, phenazine, stilbene, triphenylmethane, xanthene, thioxanthone, nitroaryl, napthoquinone, pyrenequinone or perylene-tetracarbimide dye radical, X is halogen, $C_1$–$C_4$-alkylsulfonyl, phenylsulfonyl, a sulfonic acid or phosphonic acid group or a quaternized ammonium group, r is 1 or 2, R is hydrogen or $C_1$–$C_4$ alkyl which is unsubstituted or substituted by halogen, hydroxyl, cyano, carboxyl, sulfo, sulfato, $C_1$–$C_4$-alkoxycarbonyl, $C_1$–$C_4$-alkoxy or phenyl, and A is a radical of the formula

(2)

wherein R' is hydrogen, $C_1$-$C_4$alkyl which is unsubstituted or substituted by halogen, hydroxyl, cyano, carboxyl, sulfo, sulfato, $C_1$-$C_4$-alkoxycarbonyl, $C_1$-$C_4$-alkoxy or phenyl, $C_5$-$C_6$cycloalkyl, phenyl or naphthyl each of which is unsubstituted or substituted by $C_1$-$C_4$-alkyl, $C_1$-$C_4$-alkoxy, carboxyl, sulfo or halogen, or a radical of the formula

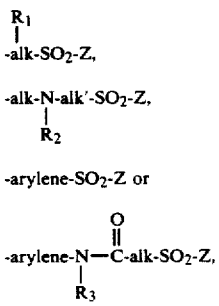

-alk-$SO_2$-Z, (3)

-alk-N-alk'-$SO_2$-Z, (3a)
  |
  $R_2$

-arylene-$SO_2$-Z or (3b)

$$\text{-arylene-N}-\overset{O}{\underset{|}{\overset{\|}{C}}}\text{-alk-SO}_2\text{-Z,} \quad (3c)$$
$$R_3$$

wherein alk and alk' are each independently of the other $C_1$-$C_6$alkylene, arylene is phenylene or naphthylene, each of which is unsubstituted or substituted by sulfo, carboxyl, $C_1$-$C_4$-alkyl, $C_1$-$C_4$-alkoxy or halogen, $R_1$ is hydrogen, hydroxyl, sulfo, sulfato, carboxyl, cyano, halogen, $C_1$-$C_4$alkoxycarbonyl, $C_1$-$C_4$alkanoyloxy, carbamoyal or the group —$SO_2$—Z, $R_2$ is hydrogen or $C_1$-$C_4$alkyl, $R_3$ is hydrogen or $C_1$-$C_4$alkyl which is unsubstituted or substituted by hydroxyl, sulfo, sulfato, carboxyl or cyano, Z is —CH=$CH_2$ or —$CH_2$—$CH_2$—Y and Y is —Cl, —Br, —F, —$OSO_3H$, —$SSO_3H$, —OCO—$CH_3$, —OCO—$C_6H_5$, —$OPO_3H_2$, —O-CO—$CCl_3$, —OCO—$CHCl_2$, —OCO—$CH_2Cl$, $OSO_2$—$R_4$, wherein $R_4$ is $C_1$-$C_4$alkyl or phenyl which is unsubstituted or substituted by $C_1$-$C_4$alkyl, or —$OSO_2$—N($C_1$-alkyl)$_2$; and R" independently has the meaning of R or is a radical of formula (3) above; or R' and R", together with the N atom, form a radical of the formula

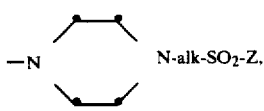

(2a)

wherein alk and Z are as defined above.

2. A reactive dye according to claim 1, wherein r is 1.
3. A reactive dye according to claim 1, wherein X is chlorine or fluorine.
4. A reactive dye according to claim 1, wherein R is hydrogen, methyl or ethyl.
5. A reactive dye according to claim 1, wherein Fa is unsubstituted or substituted by $C_1$-$C_4$alkyl, $C_1$-$C_4$alkoxy, $C_1$-$C_4$alkanoylamino, benzoylamino, amino, N-mono- or N,N-di-$C_1$-$C_4$alkylamino which is unsubstituted or substituted in the alkyl moiety by —OH, —OCOCH$_3$, —OSO$_3$H, —CN or halogen, phenylamino, mono- or disulfobenzylamino, $C_1$-$C_4$alkoxycarbonyl, $C_1$-$C_4$alkylsulfonyl, trifluoromethyl, nitro, cyano, halogen, carbamoyl, N-mono- or N,N-di-$C_1$-$C_4$alkylcarbamoyl, sulfamoyl, N-mono- or N,N-di-$C_1$-$C_4$alkylsulfamoyl, N-mono- or N,N-di-($\beta$-hydroxyethyl)sulfamoyl, N-phenylsulfamoyl, hydroxyl, carboxyl, sulfo, sulfomethyl or ureido.

6. A reactive dye according to claim 1, wherein Fa is a monoazo or polyazo, metal complex azo, anthraquinone, phthalocyanine, formazane or dioxazine dye radical, which radical is substituted by one or more radicals selected from the group consisting of $C_1$-$C_4$alkyl, $C_1$-$C_4$alkoxy, $C_1$-$C_4$alkanoylamino, benzoylamino, amino, N-mono- or N,N-di-$C_1$-$C_4$alkylamino which is unsubstituted or substituted in the alkyl moiety by —OH, —OCOCH$_3$, —OSO$_3$H, —CN or halogen, phenylamino, mono- or disulfobenzylamino, $C_1$-$C_4$alkoxycarbonyl, $C_1$-$C_4$alkylsulfonyl, trifluoromethyl, nitro, cyano, halogen, carbamoyl, N-mono- or N,N-di-$C_1$-$C_4$alkylcarbamoyl, sulfamoyl, N-mono- or N,N-di-$C_1$-$C_4$alkylsulfamoyl, N-mono- or N,N-di-($\beta$-hydroxyethyl)sulfamoyl, N-phenylsulfamoyl, hydroxyl, carboxyl, sulfo, sulfomethyl and ureido.

7. A reactive dye according to claim 1, wherein Fa is a monoazo or disazo dye radical, which radical is substituted by one or more radicals selected from the group consisting of methyl, ethyl, methoxy, ethoxy, acetylamino, benzoylamino, amino, chlorine, bromine, ureido, hydroxyl, carboxy, sulfomethyl and sulfo.

8. A reactive dye according to claim 1, wherein R' is $C_1$-$C_4$alkyl which is unsubstituted or substituted by hydroxyl, carboxyl, sulfo or sulfato, phenyl which is unsubstituted or substituted by methyl, ethyl, methoxy, ethoxy, carboxyl, sulfo or chlorine or is a radical of the formula $R_1'$ (3')
|
-alk-$SO_2$-Z', -alk-NH-alk'-$SO_2$-Z', (3a')

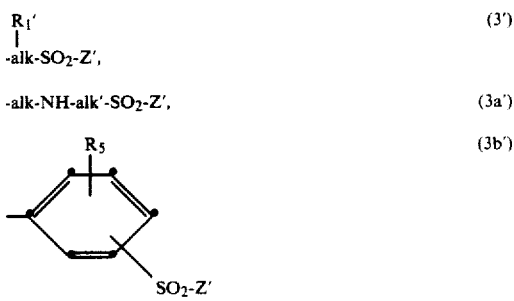

(3b')

or

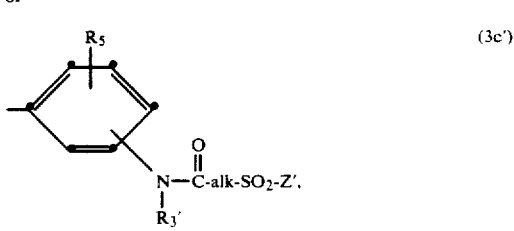

(3c')

wherein alk and alk' are each independently of the other $C_1$-$C_4$alkylene, $R_1'$ is hydrogen or the group —$SO_2$—Z', Z' is —CH=$CH_2$ or —$CH_2$—$CH_2$—Y', Y' is Cl, —$OSO_3H$, —$SSO_3H$, —$OCOCH_3$, —O-CO—$C_6H_5$ or —$OPO_3H_2$, $R_5$ is hydrogen, sulfo carboxyl, chlorine, methoxy or methyl and $R_3'$ is hydrogen or $C_1$-$C_4$alkyl.

9. A reactive dye according to claim 1, wherein R" is hydrogen, methyl, ethyl or a radical of the formula

—alk—$SO_2$—Z' (3")

wherein alk is $C_1$-$C_4$alkylene, Z' is —CH=$CH_2$ or —$CH_2$—$CH_2$—Y' and Y' is —Cl, —$OSO_3H$, —$SSO_3H$, —$OCOCH_3$, —OCO—$C_6H_5$ or —$OPO_3H_2$.

10. A reactive dye according to claim 1, wherein A is a radical of the formula

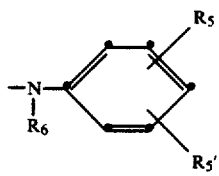                          (4)

wherein $R_6$ is hydrogen, methyl or ethyl, $R_5$ is hydrogen, sulfo, carboxyl, chlorine, methoxy or methyl and $R_5'$ independently has the meaning of $R_5$, or is a radical of the formula

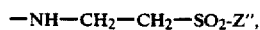   (3*)

   (3a'')

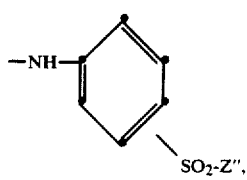   (3b'')

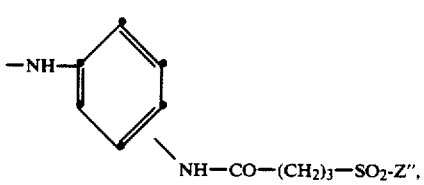   (3c'')

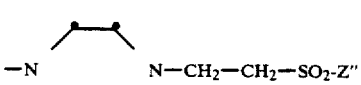   (2a')

or

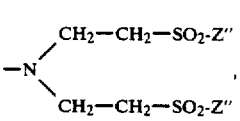   (5)

wherein each Z'' is —CH=$CH_2$, —$CH_2$—$CH_2$—Cl or —$CH_2$—$CH_2$—$OSO_3H$.

11. A reactive dye of formula (1) according to claim 1, wherein Fa is a monoazo or polyazo, metal complex azo, anthraquinone, phthalocyanine, formazane or dioxazine dye radical, which radical carries one or more sulfo groups and is further unsubstituted or substituted by one or more radicals selected from the group consisting of $C_1$-$C_4$alkyl, $C_1$-$C_4$-alkoxy, $C_1$-$C_4$alkanoylamino, benzoylamino, amino, N-mono- or N,N-di-$C_1$-$C_4$alkylamino which is unsubstituted or substituted in the alkyl moiety by —OH, —$OCOCH_3$, —$OSO_3H$, —CN or halogen, phenylamino, mono- or disulfobenzylamino, $C_1$-$C_4$alkoxycarbonyl, $C_1$-$C_4$alkylsulfonyl, trifluoromethyl, nitro, cyano, halogen, carbamoyl, N-mono- or N,N-di-$C_1$-$C_4$-alkylcarbamoyl, sulfamoyl, N-mono- or N,N-di-$C_1$-$C_4$alkylsulfamoyl, N-mono or N,N-di-($\beta$-hydroxyethyl)sulfamoyl, N-phenylsulfamoyl, hydroxyl, carboxyl, sulfo, sulfomethyl and ureido, R is hydrogen or a $C_1$-$C_4$alkyl radical which is unsubstituted or substituted by halogen, hydroxyl, cyano, carboxyl, sulfo, sulfato, $C_1$-$C_4$-alkoxycarbonyl, $C_1$-$C_4$alkoxy or phenyl, X is chlorine or fluorine, r is 1 and A is a radical of formula (2), wherein R' is $C_1$-$C_4$alkyl which is unsubstituted or substituted by hydroxyl, carboxyl, sulfo or sulfato, phenyl which is unsubstituted or substituted by methyl, ethyl, methoxy, ethoxy, carboxyl, sulfo or chlorine, or a radical of formula

          (3')

-alk-NH-alk'-$SO_2$-Z',          (3a')

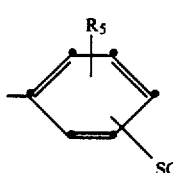          (3b')

or

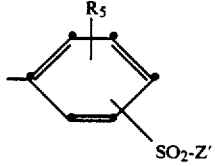          (3c')

wherein alk and alk' are each independently of the other a $C_1$-$C_4$alkylene radical, $R_1'$ is hydrogen or the group —$SO_2$—Z', Z' is —CH=$CH_2$ or —$CH_2$—$CH_2$—Y', Y' is —Cl, —$OSO_3H$, —$SSO_3H$, —$OCOCH_3$, —O-CO—$C_6H_5$ or —$OPO_3H_2$, $R_5$ is hydrogen, sulfo carboxyl, chlorine, methoxy or methyl and $R_3'$ is hydrogen or $C_1$-$C_4$alkyl, and R'' is hydrogen, $C_1$-$C_4$alkyl or a radical of formula

          (3')

wherein $R_1'$, alk and Z' are as defined above, or R' and R'', together with the N atom, are a radical of formula (2a).

12. A reactive dye of formula (1) according to claim 1, wherein Fa is a monoazo, polyazo or metal complex azo dye radical, which radical carries one or more sulfo groups and is further unsubstituted or substituted by one or more substituents selected from the group consisting of $C_1$-$C_4$alkyl, $C_1$-$C_4$alkoxy, $C_1$-$C_4$alkanoylamino, benzoylamino, amino, N-mono- or N,N-di-$C_1$-$C_4$alkylamino which is unsubstituted or substituted in the alkyl moiety by —OH, —$OCOCH_3$, —$OSO_3H$, —CN or halogen, phenylamino, mono- or disulfobenzylamino, $C_1$-$C_4$alkoxycarbonyl, $C_1$-$C_4$alkylsulfonyl, trifluoromethyl, nitro, cyano, halogen, carbamoyl, N-mono- or N,N-di-$C_1$-$C_4$alkylcarbamoyl, sulfamoyl, N-mono- or N,N-di-$C_1$-$C_4$alkylsulfamoyl, N-mono- or N,N-di-($\beta$-hydroxyethyl)sulfamoyl, N-phenylsulfamoyl, hydroxyl, carboxyl, sulfo, sulfomethyl and ureido, R is hydrogen, methyl or ethyl, X is chlorine, r is 1 and A is a radical of formula

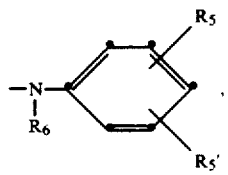 (4)

wherein $R_6$ is hydrogen, methyl or ethyl, $R_5$ is hydrogen, sulfo, carboxyl, chlorine, methoxy or methyl and $R_5'$ independently has the meaning of $R_5$, or is a radical of the formula

—NH—CH$_2$—CH$_2$—SO$_2$-Z″,  (3*)

—NH—CH$_2$—CH$_2$—NH—CH$_2$—CH$_2$—SO$_2$-Z″,  (3a″)

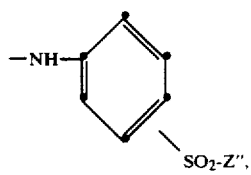 (3b″)

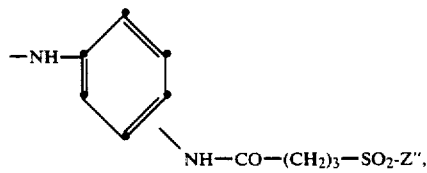 (3c″)

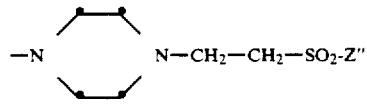 (2a′)

or

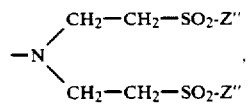 (5)

wherein each Z″ is —CH=CH$_2$, —CH$_2$—CH$_2$—Cl or —CH$_2$—CH$_2$—OSO$_3$H.

13. A reactive dye according to claim 1 of the formula

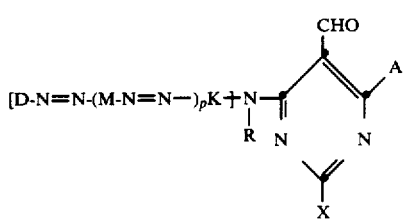 (6)

or

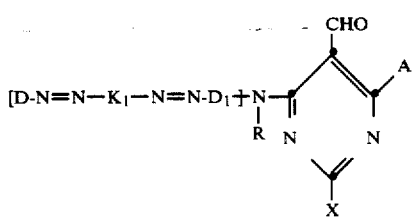 (7)

wherein D and D$_1$ are independently of the other a diazo component benzene or naphthalene radical, M is an intermediate component benzene or naphthalene radical, K is a coupling component benzene, naphthalene or heterocyclic radical, K$_1$ is a coupling component aminonaphtholsulfonic acid radical and p is 0 or 1.

14. A reactive dye according to claim 1, which is a metal complex of a monoazo or disazo dye of formula

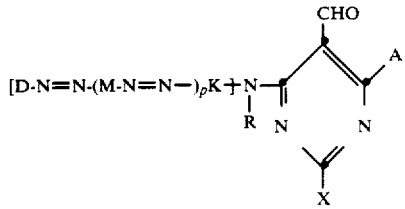 (6)

or

 (7)

wherein D and D$_1$ are each independently of the other a diazo component benzene or naphthalene radical, M is an intermediate component benzene or naphthalene radical, K is a coupling component benzene, naphthalene or heterocyclic radical, K$_1$ is a coupling component aminonaphtholsulfonic acid radical and p is 0 or 1.

15. A reactive dye according to claim 1 of the formula

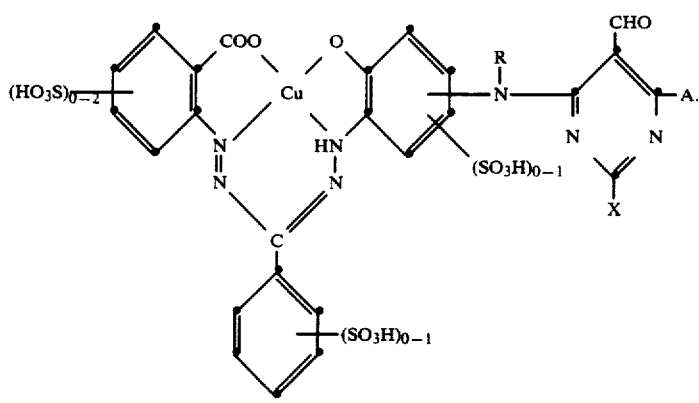
(9)